United States Patent
Gouin et al.

(10) Patent No.: US 10,434,569 B2
(45) Date of Patent: *Oct. 8, 2019

(54) FILTRATION DEVICE FOR THE FILTRATION OF A LIQUID METAL OR AN ALLOY THEREOF, AND A FILTRATION METHOD USING SAID FILTRATION DEVICE

(71) Applicant: LES PRODUITS INDUSTRIELS DE HAUTE TEMPERATURE PYROTEK INC., Sherbrooke, Quebec (CA)

(72) Inventors: Marcel Gouin, Sherbrooke (CA); Maurice Lacasse, Stoke (CA); Jay Fritzke, North East, PA (US); Michael Bouchard, Sherbrooke (CA)

(73) Assignee: LES PRODUITS INDUSTRIELS DE HAUTE TEMPERATURE PYROTECK INC., Sherbrooke (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/224,028

(22) Filed: Jul. 29, 2016

(65) Prior Publication Data
US 2017/0028466 A1 Feb. 2, 2017

Related U.S. Application Data

(63) Continuation-in-part of application No. 15/113,754, filed as application No. PCT/CA2015/050047 on Jan. 23, 2015.
(Continued)

(51) Int. Cl.
*B22D 43/00* (2006.01)
*B22C 9/08* (2006.01)
(Continued)

(52) U.S. Cl.
CPC .............. *B22D 43/00* (2013.01); *B22C 9/086* (2013.01); *C22B 9/023* (2013.01); *C22B 21/066* (2013.01); *B22D 18/04* (2013.01)

(58) Field of Classification Search
CPC ...................................................... B22D 43/004
See application file for complete search history.

(56) References Cited

U.S. PATENT DOCUMENTS

| 4,154,289 A | 5/1979 | Jeanneret |
| 4,781,858 A | 11/1988 | Mizukami et al. |

(Continued)

FOREIGN PATENT DOCUMENTS

| CN | 103 736 970 A | 4/2014 |
| CN | 204 262 287 U | 4/2015 |

(Continued)

OTHER PUBLICATIONS

International Preliminary Report on Patentability for International Patent Application No. PCT/CA2015/050047 dated Apr. 26, 2016, 72 pages.

(Continued)

*Primary Examiner* — Scott R Kastler
(74) *Attorney, Agent, or Firm* — Brinks Gilson & Lione

(57) ABSTRACT

Filtration devices are provided with original structural features to allow a better stiffness of the same and prevent the possibility of being distorted and/or driven under the pressure of a flux of liquid metal or an alloy thereof which is passing there through. Said features may consist of a ridge portion extending the periphery of a filtration device, a rim portion provided in double-basket filtration devices, or a particular «M» shape filtration device.

17 Claims, 13 Drawing Sheets

Related U.S. Application Data

(60) Provisional application No. 61/930,800, filed on Jan. 23, 2014.

(51) Int. Cl.
*C22B 21/06* (2006.01)
*C22B 9/02* (2006.01)
*B22D 18/04* (2006.01)

(56) References Cited

U.S. PATENT DOCUMENTS

| | | | |
|---|---|---|---|
| 4,857,489 | A | 8/1989 | Bearden |
| 5,366,209 | A | 11/1994 | Daussan et al. |
| 6,254,810 | B1 | 7/2001 | Delvaux et al. |
| 6,270,717 | B1 | 8/2001 | Tremblay et al. |
| 8,273,289 | B2 | 9/2012 | Hitchings |
| 8,939,193 | B2 | 1/2015 | Stoyanov et al. |
| 2010/0176542 | A1 | 7/2010 | Juma |
| 2017/0008075 | A1 | 1/2017 | Gouin et al. |
| 2017/0028466 | A1* | 2/2017 | Gouin .................. B22D 43/00 |

FOREIGN PATENT DOCUMENTS

| | | |
|---|---|---|
| DE | 32 44 079 A1 | 6/1984 |
| DE | 198 59 031 C1 | 7/2000 |
| WO | WO 2008/034856 A2 | 3/2008 |
| WO | WO 2011/019593 A1 | 2/2011 |
| WO | WO 2015/109408 A1 | 7/2015 |

OTHER PUBLICATIONS

International Preliminary Report on Patentability (Corrected Version) for International Patent Application No. PCT/CA2015/050047 dated Apr. 26, 2016, 4 pages.
International Search Report and Written Opinion for International Patent Application No. PCT/CA2015/050047 dated Apr. 27, 2015, 8 pages.
International Search Report and Written Opinion for International Patent Application No. PCT/CA2017/050908 dated Oct. 31, 2017, (11 pages).
European Search Report dated Nov. 23, 2017, for European Patent Application No. 15741063.0, pp. 10.
International Preliminary Report on Patentability for International Patent Application No. PCT/CA2017/050908, dated Jul. 30, 2018, 25 pages.
Supplementary European Search Report and Office Action for corresponding European Patent Application No. EP 15741063.0, dated Mar. 27, 2018, 13 pages.
Examination Report for corresponding Indonesian Patent Application No. P00201605501, dated Apr. 22, 2019, 2 pages.
Extended European Search Report for corresponding European Patent Application No. EP 18203779.6, dated Mar. 14, 2019, 7 pages.
Extended European Search Report for corresponding European Patent Application No. EP 1733157.5, dated Jun. 17, 2019, 14 pages.
Office Action for corresponding U.S. Appl. No. 15/113,754, dated Nov. 16, 2017, 10 pages.
Office Action for corresponding U.S. Appl. No. 15/133,754, dated May 4, 2018, 9 pages.
First Search report for corresponding Chinese Patent Application No. CN 201580005499.8, dated Mar. 22, 2018, 2 pages.
Second Office Action for corresponding Chinese Patent Application No. CN 201580005499.8, dated Dec. 19, 2018, 6 pages, in Chinese language.
Second Office Action for corresponding Chinese Patent Application No. CN 201580005499.8, dated Dec. 19, 2018, 8 pages, English language translation.
Third Office Action for corresponding Chinese Patent Application No. CN 201580005499.8, dated May 17, 2019, 3 pages, in Chinese language.
Third Office Action for corresponding Chinese Patent Application No. CN 201580005499.8, dated May 17, 2019, 5 pages, English language translation.
Office Action for corresponding Vietnamese Patent Application No. VN1-2016-03122, dated Dec. 25, 2018, 1 pages, in Vietnamese language.
Office Action for corresponding Vietnamese Patent Application No. VN1-2016-03122, dated Dec. 25, 2018, 2 pages, English language translation.
Office Action for corresponding Japanese Patent Application No. JP 2016-565527, dated May 8, 2018, 4 pages, in Japanese language.
Office Action for corresponding Japanese Patent Application No. JP 2016-565527, dated May 8, 2018, 5 pages, English language translation.
Office Action for corresponding Japanese Patent Application No. JP 2016-565527, dated Nov. 13, 2018, 3 pages, in Japanese language.
Office Action for corresponding Japanese Patent Application No. JP 2016-565527, dated Nov. 13, 2018, 3 pages, English language translation.
Office Action for corresponding Canadian Application No. 2936512, dated Sep. 12, 2016, 5 pages.
Office Action for corresponding Canadian Application No. 2936512, dated Feb. 23, 2017, 3 pages.

* cited by examiner

FILTRATION DEVICE FOR THE FILTRATION OF A LIQUID METAL OR AN ALLOY THEREOF, AND A FILTRATION METHOD USING SAID FILTRATION DEVICE

CROSS REFERENCE TO A RELATED APPLICATION

The present patent application is a continuation-in-part of U.S. patent application Ser. No. 15/113,754, now U.S. Pat. No. 10,201,849 which is a national phase entry of International application PCT/CA2015/050047, entitled A COMPOSITION, A METHOD FOR PREPARING SAID COMPOSITION, A METHOD FOR PREPARING A RIGIDIFIED FABRIC, THE RIGIDIFIED FABRIC SO OBTAINED, A FILTRATION DEVICE, METHODS FOR THE MANUFACTURE OF THE FILTRATION DEVICE, INSTALLATION, PROCESS AND USE OF SAID FILTRATION DEVICE FOR THE FILTRATION OF A LIQUID METAL OR AN ALLOY THEREOF, filed Jan. 23, 2015 by LES PRODUITS INDUSTRIELS DE HAUTE TEMPERATURE PYROTEK INC., said international application claiming the priority of U.S. provisional patent application Ser. No. 61/930,800, filed Jan. 23, 2014, the content of which are incorporated herein by reference in their entirety.

FIELD OF THE INVENTION

The invention relates to new filtration devices for the filtering of a liquid metal (e.g. aluminum) or an alloy thereof, the filtering being carried out in any kind of casting processes using filtration devices, and more particularly in a gravity casting process or in a low pressure casting process.

BRIEF DESCRIPTION OF THE PRIOR ART

Filtration devices are used during casting processes to prevent some debris and/or impurities to enter the cavities. These filtration devices which are subjected to a pressure exerted by a flow of liquid metal or alloy passing there through, may consist of metallic filters (i.e. grids of metal threads), non-metallic filters (i.e. fabrics of heat resistant fibers eventually provided with a protective coating), or ceramic foam filters. Each filtration device has a geometric configuration that is matching with a corresponding housing provided at the inlet of a mold cavity.

Normally, debris and/or impurities are retained by the filtration device and, after the liquid metal or alloy has solidified within the mold, they remained trapped within a chunk (i.e. protrusion) of metal that will be detached from the molded article by any appropriate means very well known to persons skilled in art, and re-melted for metal recovery.

Occasionally the pressure exerted by the flow of liquid metal or alloy passing through the filtration device may deform the same to allow some debris and/or impurities to enter the cavity intended to form the molded article. Worst, it may happen that said flow of liquid metal drives the filtration device within the cavity of the mold. In both situations, resulting articles are rejected by the quality control to thereby reduce the efficiency of the casting process and increase the operation costs.

It is often difficult to efficiently recycle the metal or metal alloy from said chunks. Indeed, filtration devices made of a fabric of metal threads gather at the bottom of the liquid metal or metal alloy (making them hard to recover), and they can partially dissolved into the re-melted metal or metal alloy to contaminate and/or modifying the chemistry of the same. Also, ceramic foam filters can partially disintegrate and contaminate the liquid metal or alloy, and/or gather in the bottom of the liquid metal or alloy (making them hard to recover). Alternatively, existing filtration devices made of a rigidified fabric of heat resistant fibers gather at the top of the liquid metal or liquid metal alloy (making them easy to recover). An easy and/or rapid recovery of the filtration device is of economical interest.

Concerning Existing Filters Made of a Rigidified Fabric of Heat Resistant Fibers Filtering device (i.e. fabric filters) consisting of a rigidified fabric made from heat resistant fibers or threads made of heat resistant fibers, are of economic interest. Indeed, as the metal chunk (e.g. an aluminum chunk) results from the casting of a metal article into a mold, said chunk contains the fabric filter having filtered the liquid metal poured into the mold. When this chunk is recovered and then re-melted for recycling purposes, contrary to filters made of steel threads which will gather at the bottom of the melting pots, filters made of rigidified heat resistant fibers float on top of the liquid metal or metal alloy to make them very easy to retrieve.

Some attempts were made to embody fabric filters allowing the filtration of liquid metal (e.g. liquid aluminum or aluminum alloys) before being poured into a mold. Fabric made of heat resistant fibers or threads made of heat resistant fibers, are known. They have fibers (e.g. glass fibers) coated with a sizing material (e.g. starch). Said existing fabric can be made of unwoven fibers (to form a felt of heat resistant fibers), or made of threads of heat resistant fibers. Said threads are woven together according to weaving techniques well known to persons skilled in the art. According to the prior art, such fabric can be rigidified by applying thereon a rigidifying material, in order to make it stiff enough to not being deformed by the pressure of a liquid metal passing through its opening, especially liquid aluminum. However, applying a rigidifying material on the sizing material of the heat resistant fibers reveals to provide serious drawbacks that will discourage a person skilled in the art using filters prepared this way.

The presence of a rigidifying material (i.e. a coating) shows several drawbacks that would discourage a person skilled in the art to consider using such filters for the filtration of liquid metal such as liquid aluminum or aluminum alloys. Indeed, the coating on the fibers of the resulting fabric shows the drawback of generating a clogging and/or partial obstruction of openings between threads (i.e. reducing the mesh size of the fabric filters). Also, because the protective/rigidifying coating is often brittle, particles may detach therefrom to contaminate the liquid aluminum, especially when applied on the sizing material of the fibers. Therefore, up to now, attempts for the replacement of such filtration devices by filtration devices made of a fabric of rigidified heat resistant fibers (e.g. of glass fibers or silica fibers) failed to be successful.

Indeed, contrary to filtration devices made of a fabric of metal threads, existing filtration devices made of a fabric of rigidified heat resistant fibers or threads of heat resistant fibers, are not stiff enough to prevent being deformed by the pressure of the liquid flowing through them, and therefore they fail to work properly (i.e. to efficiently perform the filtration of the liquid metal or the liquid metal alloy). Furthermore, even if existing filtration devices made of a fabric of rigidified heat resistant fibers can be shaped to have an increased filtration surface, they show the drawbacks of having a meshing that may be partially clogged by the substances used for the rigidification of the fabric (thereby reducing the effective filtration surface of the filtration device). Finally, in some cases, even filtration devices which are made of metal threads may be deformed by the flow of liquid metal or allow, and eventually driven within the cavity of the mold.

Therefore, there is a strong need in the industry for a fabric filters allowing the filtration of liquid metal, such as liquid aluminum or liquid aluminum alloys, while pouring said liquid metal into a mold, and without having the drawbacks associated with existing filters.

Concerning Ceramic Foam

When a ceramic foam is used during a casting process, the molded article is removed from the mold and the ceramic foam filter remains trapped within a chunk of the molded article. Said chunk is then removed from the finished article by any appropriate means well known to persons skilled in the art, and re-melted for metal recovery. However, as mentioned above, it is often difficult to efficiently recycle the metal or metal alloy from said chunks. Indeed, the ceramic foam filters they contain can partially disintegrate and contaminate the liquid metal or metal alloy, and/or gather in the bottom of the liquid metal or metal alloy (making them hard to recover).

Also, ceramic foam filters show the drawback of having an impact on the temperature of the liquid metal or metal alloy (i.e. the ceramic foam filters have a thermal mass), and eventually affecting the chemistry of the metal or metal alloy which fills the cavity of the mold (i.e. the chemistry of the resulting molded article). Furthermore, because a ceramic foam filter is a monolithic piece of matter, it can be difficult to increase the effective filtration surface of the same.

Therefore, there is a strong need for a new filtration device allowing to replace existing ceramic foam filters in a method using such a filtration device for the casting an article into a mold. Indeed drawbacks associated with the presence of ceramic foam filters needed to be avoided and/or minimized. More particularly, there is a strong need for a filtration device having a low thermal mass in order to minimize and/or avoid having an impact on the temperature of the liquid metal, allowing to increase the filtration surface, and/or allowing a faster priming of the filter.

Also, the Applicant has further discovered various embodiments which overcome drawbacks associated with said existing filtration devices made of a fabric of rigidified heat resistant fibers and/or threads of heat resistant fibers. More particularly, it is worth mentioning amongst said numerous advantages, that said filtration device according to the invention prevents being deformed by the flow of liquid passing there through, prevents partial obstruction of the meshing, prevents contamination of the filtered liquid metal or liquid metal alloy (e.g. liquid aluminum or aluminum alloy), and/or optionally allows an easy handling by a tool provided with a magnet (especially a robotized arm provided with said tool), while being as efficient as corresponding existing filters, such as filters made of metal threads.

Also, the Applicant has surprisingly discovered that it was possible to overcome drawbacks associated with filtering devices made of a fabric of metal threads or made of fabric of heat resistant fibers, when using a filtration device made of a fabric or rigidified heat resistant fibers, having a particular structural shape and orientation.

Also, the Applicant has surprisingly discovered that it was possible to overcome drawbacks associated with ceramic foam filters by replacing them with less expensive filtration devices made of a fabric of metal threads or of a rigidified filter of heat resistant fibers, such as heat resistant fibers selected from the group consisting of glass fibers or silica fibers.

Concerning the filtration device made of a fabric of metal threads (e.g. stainless steel threads), said metal threads may partially dissolved when contacting the liquid metal or metal alloys to be filtered, to thus contaminate the same. As an example, when metal threads are made of stainless steel, and the liquid metal alloy to be filtered is an aluminum alloy, then said aluminum alloy can be contaminated with iron. Therefore, the use of a filtration device made of metal threads is limited by the possibility of significantly negatively affecting the chemistry of the filtered liquid metal or alloy.

Some, but not all, foundries use magnetic placement of filtration devices in openings of mold cavities. This can either be a performed with a magnetic tool used by an operator for manual placement, or a magnetic tool attached to a robot for automated placement. Also, some but not all foundries use X-ray inspection to confirm the filtration devices are properly positioned in the opening of mold cavities. It is to be noted that handling of a filter or filtration device may be difficult to incorporate into an automated and robotized process. Indeed, filters are usually placed across the inlet of the cavity of the mold manually with a tool grasping them.

Therefore, this is a strong need in the industry for filtration devices that can be easily handled and positioned in openings of mold cavities, especially with an automated robotized apparatus, and allow a confirmation of the proper positioning with an X-ray apparatus.

Also, there is a strong need for a new filtration device made of a fabric of rigidified heat resistant fibers or threads of heat resistant fibers, allowing an easy and/or rapid recovery of the of the same from liquid metal resulting from chunks of metal obtained from molded articles, thereby defining an economical advantage over existing filters.

Also, there is a strong need for a new filtration device made of a fabric of rigidified heat resistant fibers or made of threads of heat resistant fibers, wherein the above-mentioned drawbacks are avoided and/or minimized.

Also, there is a strong need for a new filtration device preventing to reduce its filtration surface by reduction of the size of the openings, and optionally allowing to increase said filtration surface by modifying its shape and/or allowing a faster priming of the same.

Also, there is a strong need for a method for the manufacture of the new filtration device defined hereinabove, and the filtration device so obtained.

Also, there is a strong need for a casting process using filtration devices as defined hereinabove, more particularly a gravity casting process or low pressure casting process, and more preferably an automated low pressure casting process, where a filtration device made of a fabric of rigidified heat resistant fibers as defined hereinabove.

Also, there is a strong need in the metallurgic industry for a filtration device made of a fabric of heat resistant fibers or threads of said heat resistant fibers as defined hereinabove, in any kind of casting processes using filtration devices, more particularly a gravity casting process or a low pressure casting installation, without having the drawbacks associated with existing filtration devices.

Also, there is a strong need for improved filtration devices that will prevent being deformed and/or driven by the pressure exerted by a flow of liquid metal or alloy passing there through during a casting process.

The Applicant has now surprisingly discovered various embodiments of filtration devices which have improved structural properties in order to prevent the same to be
  a) deformed by the pressure exerted by the flow of liquid metal or an alloy thereof to allow debris and/or impurities to enter within the cavity along with said liquid metal or alloy, or
  b) driven within the mold cavity by the pressure exerted by the flow of liquid metal or an alloy thereof, to allow in addition of the filtration device, debris and/or impurities to enter within the cavity along with said liquid metal or the alloy thereof.

Also, the Applicant surprisingly discovered that improved structural features allows to fulfill aforesaid needs.

SUMMARY OF THE INVENTION

According to the invention, the filtration devices are provided with original structural features allowing a better stiffness of the same to further prevent the possibility of being distorted and/or driven under the pressure of a flux of liquid metal or an alloy thereof which is passing there through.

According to a first preferred aspect, the invention relates to a filtration device for filtering a liquid metal or an alloy thereof, wherein said filtration device has a lower face, an upper face, a peripheral edge, a main portion, and a peripheral portion surrounding the main portion, the peripheral portion being shaped to form a concave cavity at the upper face and a convex rim at the lower face; and wherein a ridge portion extends the peripheral portion.

The Applicant has surprisingly discovered that adding a ridge portion to a filtration device provided with a main portion contacted by a spreader or a distribution pin, said ridge portion extending horizontally or at an angle along a seat provided in the sprue cavity, shows unexpected benefits. Indeed, the Applicant has discovered that:
  The ridge portion is particularly useful for:
    Providing an easy and consistent placement/position of the filtration device in the sprue cavity, where the ridge 'self-centers' the filtration device in the sprue cavity and ensures it is horizontally level for the full circumference of the filtration device.
    Increases the strength of the overall filtration device design, allowing slight compression from the spreader tip (or distribution pin) to hold the filtration device in place without distorting the position or shape of the filtration device.
  Filtratin device is extending up in contact with the spreader tip (or distribution pin):
    A slight compression from the spreader tip puts the filtering device in a subtle but continual tension during casting, helping the filtration device to maintain its shape and integrity throughout casting.

According to another embodiment of the above-mentioned first preferred aspect, the invention relates to a filtration device for filtering a liquid metal or an alloy thereof, wherein said filtration device is made of a rigidified fabric of heat resistant fibers or made of threads of heat resistant fibers, impregnated with a composition comprising a mixture of a product A and a product B:
  the product A being obtained by polymerisation of saccharide units; and
  the product B consisting of at least one inorganic colloidal binding agent, said composition being in a thermoset stage. Preferably said heat resistant fibers being glass fibers, silica fibers or a mixture thereof.

According to another embodiment of the above-mentioned first preferred aspect, the invention relates to a filtration device for filtering a liquid metal or an alloy thereof, wherein the main portion is a dome having its summit oriented toward the upper face.

According to another embodiment of the above-mentioned first preferred aspect, the invention relates to a filtration device for filtering a liquid metal or an alloy thereof, further provided with an insert made of a magnetisable material for handling of the filtration device with a tool provided with a magnet.

According to another embodiment of the above-mentioned first preferred aspect, the invention relates to a filtration device for filtering a liquid metal or an alloy thereof, wherein the heat resistant fibers are glass fibers, silica fibers or a mixture thereof, and wherein the product A is obtained by caramelization of a mixture M comprising sucrose, water, and optionally at least one additive selected from the group consisting of acids, inorganic wetting agents and acid phosphate adhesives.

According to another embodiment of the above-mentioned first preferred aspect, the invention relates to a filtration device for filtering a liquid metal or an alloy thereof, wherein the main portion has a frustoconical shape having its summit oriented toward the upper face.

According to another embodiment of the above-mentioned first preferred aspect, the invention relates to a filtration device for filtering a liquid metal or an alloy thereof, further provided with an insert made of a magnetisable material for handling of the filtration device with a tool provided with a magnet.

According to another embodiment of the above-mentioned first preferred aspect, the invention relates to a filtration device for filtering a liquid metal or an alloy thereof, wherein the heat resistant fibers are glass fibers, silica fibers or a mixture thereof, and wherein the product A is obtained by caramelization of a mixture M comprising sucrose, water, and optionally at least one additive selected from the group consisting of acids, inorganic wetting agents and acid phosphate adhesives.

According to a second preferred aspect, the invention relates to a filtration device for filtering a liquid metal or an alloy thereof, said filtration device being of the type having interconnected baskets, said baskets being provided with original structural features allowing a better stiffness of the same to further prevent the possibility of being distorted under the pressure of the flux of liquid metal or an alloy thereof, passing there through. More particularly, said filtration device is made of a first basket and a second basket, wherein the first basket has an outer wall and a cavity defined by an inner wall, an end wall and an opening opposite to the end wall,
wherein the second basket has an outer wall and a cavity defined by an inner wall, an end wall and an opening opposite to the end wall,
wherein the opened end of the first basket is housed in the cavity of the second basket to define a filtration body having a structural shape and orientation and comprising a cavity, an upper face, a lower face, and a side face,
wherein the end wall of the first basket corresponds to the upper face, and the end wall of the second basket corresponds to the lower face,
wherein when the outer wall of the first basket is sized to fit against the inner wall of the second basket, the outer wall of the second basket corresponds at least in part to the side face of the filtration body, or when the outer wall of the second basket is sized to fit against the inner wall of the first basket, the outer wall of the first basket corresponds at least in part to the side face of the filtration body; and wherein the outer wall of the first basket has a top portion and side portion joined by a peripheral portion forming a rim; and the outer wall of the second basket has a bottom portion and a side portion joined by a peripheral portion forming a rim.

According to another embodiment of the above-mentioned second preferred aspect, the end wall of the first basket corresponds to the lower face of the filtration device, and the end wall of the second basket corresponds to the upper face of the filtration device, According to another embodiment of the above-mentioned second preferred aspect, said filtration device further comprises a filtration pad within the cavity.

According to another embodiment of the above-mentioned second preferred aspect, said filtration device is made of a rigidified fabric of heat resistant fibers or made of threads of heat resistant fibers, impregnated with a composition comprising a mixture of a product A and a product B:
 the product A being obtained by polymerisation of saccharide units; and
 the product B consisting of at least one inorganic colloidal binding agent, said composition being in a thermoset stage.

According to another embodiment of the above-mentioned second preferred aspect, the invention relates to a filtration device for filtering a liquid metal or an alloy thereof, further provided with an insert made of a magnetisable material for handling of the filtration device with a tool provided with a magnet.

According to another embodiment of the above-mentioned second preferred aspect, the invention relates to a filtration device for filtering a liquid metal or an alloy thereof, wherein the heat resistant fibers are glass fibers, silica fibers or a mixture thereof, and wherein the product A is obtained by caramelization of a mixture M comprising sucrose, water, and optionally at least one additive selected from the group consisting of acids, inorganic wetting agents and acid phosphate adhesives.

The invention further relates to a third preferred aspect of the invention, said third embodiment having an innovative «M» shape. This particular «M» shaped filtration device can be made of any appropriate material, including the conventional fabric of metal threads for the filtration of liquid metal or an alloy thereof during the casing of an article into a mold. However, it is preferred having this «M» shaped filtration device made of a rigidified fabric of heat resistant fibers.

More particularly, according to another embodiment of the above-mentioned third preferred aspect, the invention relates to a filtration device for the filtration of a molten metal or an alloy thereof, wherein said filtration device is a fabric of metal threads or a fabric of rigidified fibers, said filtration device having a shape that is to be housed within a housing of a casting mold provided with at least one filing inlet, wherein the housing is a parallelepiped, and wherein the fabric is defining a «M» shaped filter, said «M» shape filter having a pair of parallel branches which are to be respectively substantially coplanar with a pair of opposite end of the parallelepipedic housing, and an arch portion having a tip which is either to be oriented toward the cavity, or opposite to the cavity.

According to another embodiment of the above-mentioned third preferred aspect, the invention relates to a filtration device for the filtration of a molten metal or an alloy thereof, wherein the tip of the arch portion is oriented opposite to the cavity.

According to another embodiment of the above-mentioned third preferred aspect, the the fabric is made of stainless steel threads woven together.

According to another embodiment of the above-mentioned third preferred aspect, the invention relates to a filtration device for the filtration of a molten metal or an alloy thereof, wherein the filtration device is made of a rigidified fabric of heat resistant fibers woven together. The use of rigidified heat resistant fibers is unexpected to person skilled in the art, considering the form of the filtration devices.

The Applicant has surprisingly discovered that a «M» shaped filtration device shows the following unexpected benefits:
 Improved consistency of casting pour times as a result of weaving of material, in contrast to relative high variation in pour times with conventional Ceramic Foam Filters
 Rigidity of filtration device made of rigidified heat resistant fiber or threads throughout casting cycle (e.g. the material keeps its shape in a 700° C. mold for 30 seconds before it even sees molten metal (e.g. molten aluminium)).
 The arch provides additional surface area for metal flow distribution and filtration.

According to another embodiment of the above-mentioned third preferred aspect, the invention relates to a filtration device for the filtration of a molten metal or an alloy thereof, wherein the rigidified fabric of heat resistant fibers obtained by thermosetting a composition comprising a mixture of a product A and a product B;
 the product A being obtained by polymerisation of saccharide units; and
 the product B consisting of at least one inorganic colloidal binding agent impregnated in a fabric of heat resistant fibers that is substantially free of one or more sizing agents, said sizing agents consisting of organic polymers.

According to another embodiment of the above-mentioned third preferred aspect, the invention relates to a filtration device for the filtration of a molten metal or an alloy thereof, wherein the heat resistant fibers are glass fibers, silica fibers or a mixture thereof, and wherein the product A is obtained by caramelization of a mixture M comprising sucrose, water, and optionally at least one additive selected from the group consisting of acids, inorganic wetting agents and acid phosphate adhesives.

DETAILED DESCRIPTION OF THE INVENTION

Aforesaid filtration devices can be made of any appropriate material, such as a grid of metal threads according to techniques well known in the art. However, it is preferred that the filtration devices be made of a fabric of heat resistant fibers, and more particularly of a fabric of a rigidified heat resistant material as defined in the above-identified co-pending U.S. application Ser. No. 15/113,754.

A composition for preparing the rigidified fabric made of heat resistant fibers or threads of heat resistant fibers, preferably of woven threads made of heat resistant fibers, comprises a mixture of a product A and a product B:
 the product A being obtained by polymerisation of carbohydrate units, natural or synthetic, preferably a saccharide, and more preferably a sugar such as glucose, fructose, galactose, sucrose, maltose, lactose, etc.; and the product B consisting of at least one additive such as a binding agent.

More particularly, said composition comprises a mixture of a product A and a product B;
the product A being obtained by caramelization of a mixture M comprising:
sucrose,
water, and
optionally at least one additive; and
the product B consisting of at least one inorganic colloidal binding agent.

A method for preparing the composition for the manufacture of a rigidified fabric made of heat resistant fibers or made of threads made of heat resistant fibers, said composition comprising a mixture of a product A and a product B:
the product A being obtained by polymerisation of carbohydrate units, natural or synthetic, preferably a saccharide, and more preferably a sugar such as glucose, fructose, galactose, sucrose, maltose, lactose, etc.; and
the product B consisting of at least one additive such as a binding agent;
said method comprises the steps of:
polymerizing the carbohydrate units to obtained a polymerized carbohydrate, and
mixing the product A with the product B.

According to another preferred embodiment, the rigidified fabric is made of woven threads made of glass fibers, silica fibers or a mixture thereof.

According to another preferred embodiment, the composition for preparing the rigidified fabric made of heat resistant fibers or made of threads of heat resistant fibers, said heat resistant fibers being glass fibers, silica fibers or a mixture thereof, comprises a mixture of a product A and a product B; the product A being obtained by caramelization of a mixture M comprising: sucrose, water, and optionally at least one additive selected from the group consisting of acids, inorganic wetting agents and acid phosphate adhesives; and the product B consisting of at least one inorganic colloidal binding agent. More preferably, the rigidified fabric is made of woven threads of glass fibers, silica fibers or a mixture thereof.

According to another preferred embodiment, the sucrose may be of any kind commonly used to make a «caramel». Preferably, the sucrose is a food-grade, refined and granulated sucrose (e.g. table sugar).

According to another preferred embodiment, the water may consist of any kind of water allowing to make a «caramel», including tap water, distilled water, demineralized water, etc. Preferably, the water is tap water.

According to another preferred embodiment, the acid may be phosphoric acid, sulfuric acid, citric acid, acetic acid or a mixture of at least two of them. Preferably, the acid may be phosphoric acid.

According to another preferred embodiment, the inorganic wetting agent may be aluminum ammonium sulfate, magnesium sulfate, aluminum sulfate, calcium sulfate or a mixture of at least two of them. More preferably, the inorganic wetting agent may be aluminum ammonium sulfate.

According to another preferred embodiment, the acid phosphate adhesive may be calcium phosphate, magnesium phosphate, aluminum sulfate or a mixture of at least two of them. More preferably the acid phosphate adhesive may be calcium phosphate.

According to another preferred embodiment, the at least one inorganic colloidal binding agent may consist of a colloidal silica, a colloidal alumina, a colloidal zirconia or a mixture of at least two of them. Preferably said at least one inorganic colloidal binding agent is a colloidal silica. More preferably, said at least one inorganic colloidal binding agent may consist of colloidal silica dioxide, such as for example a colloidal silica dioxide which is a colloidal dispersion of submicron-sized silica particles in the form of tiny spheres, in an alkaline aqueous solution. Much more preferably, the inorganic colloidal binding agent is a colloidal dispersion of submicron-sized silica particles in the form of tiny spheres, in an alkaline aqueous solution and sold under the trademark NALCO 1144®. Said NALCO 1144® has the following properties:

| | |
|---|---|
| Colloidal Silica as $SiO_2$: | 40%, |
| pH @ 25° C.: | 9.9, |
| Average particle Diameter: | 14 nm, |
| Specific Gravity: | 1.30, |
| Viscosity: | 15 cP, and |
| $Na_2O$ | 0.45%. |

According to another preferred embodiment, the mixture M comprises:
30 wt % to 70 wt %, preferably about 55.0 wt. %, of sucrose;
70 wt. % to 30 wt. %, preferably about 41.5 wt. %, of water;
0 wt. % to 1.8 wt. %, preferably about 1.1 wt. %, of phosphoric acid;
0 wt. % to 1.7 wt. %, preferably about 1.0 wt. %, of aluminum ammonium sulfate; and
0 wt % to 2.0 wt %, preferably about 1.4 wt. %, of calcium phosphate monobasic.

According to another preferred embodiment of the invention relates to the composition defined hereinabove, wherein phosphoric acid originates from a mixture of 75 wt % $H_3PO_4$ and 25 wt % water, the amount of water being part of the total amount of water of the composition, the aluminium ammonium sulfate is $AlNH_4(SO_4)_2 \cdot 2H_2O$, and the calcium phosphate monobasic is $Ca(H_2PO_4)_2 \cdot 2H_2O$.

According to another preferred embodiment, said composition comprises from 50 wt. % to 85 wt. % of the product A and from 15 wt. % to 50 wt. % of the product B. Preferably, said composition may comprise about 66 wt. % of the product A and about 34 wt. % of the product B.

According to another preferred embodiment, the caramelization is carried out by heating the mixture M at a boiling temperature, preferably between 100° C. and 105° C., more preferably between 100° C. and 103° C., for a period of time varying from 5 to 10 minutes, more preferably about 5 minutes, and then allowing the resulting product A to cool.

According to another preferred embodiment, the at least one inorganic colloidal binding agent is added to the product A by mixing.

According to another preferred embodiment, the rigidified fabric is made of threads of heat resistant fibers selected from the group consisting of acids, inorganic wetting agents and acid phosphate adhesives, said threads having a diameter varying from 0.864 mm to 0.533 mm, and the fabric having a meshing varying from 0.94 mm to 0.255 mm, and from 50.9% to 35.9% of openings with respect to the total surface of the fabric.

According to another preferred embodiment, the heat resistant fibers (including heat resistant fibers of the threads of heat resistant fibers) are made of E-Glass, S-Glass or High Silica Glass. More preferably, it is to be noted that glass fibers or threads of glass fibers may originate from a fabric of glass fiber well known to skilled workmen and easily available on the market, said fabric being treated to remove a polymeric sizing (such as starch) that is present on the fibers (especially to protect them during their processing/manipulation).

According to another embodiment, a method for the preparation of a rigidified fabric made of heat resistant fibers or made of threads of heat resistant fibers, said method comprising the steps of:

a) impregnating a fabric made of heat resistant fibers or made threads of heat resistant fibers, said heat resistant fibers or heat resistant fibers of the threads being substantially free of one or more sizing agents consisting of organic polymers, with a composition as defined hereinabove, to obtain a fabric impregnated with said composition;

b) subjecting the fabric impregnated with the composition, as obtained from step a), to a heating treatment at a temperature of about 101° C. to 160° C. to place the composition impregnated in said fabric into a softened thermoplastic state, and optionally allowing the fabric so obtained to cool;

c) optionally forming the fabric obtained from step b) into a desired shape and optionally allowing the fabric so obtained to cool; and d) subjecting the fabric impregnated with the composition, as obtained from step b) or c), to a thermosetting treatment by heating it to a thermosetting temperature to thermoset the thermoplastic composition impregnated in the fabric in order to rigidify the fabric by cross-linking of the heat resistant fibers or the heat resistant fibers of the threads.

According to another embodiment, a method for the preparation of a thermoplastic, rigidified fabric made of heat resistant fibers or made of threads of heat resistant fibers, said method comprising the steps of:

a) impregnating a fabric made of heat resistant fibers or made of threads of heat resistant fibers, said heat resistant fibers or heat resistant fibers of the threads being substantially free of one or more sizing agents consisting of organic polymers, with a composition as defined hereinabove, to obtain a fabric impregnated with said composition;

b) subjecting the fabric impregnated with the composition, as obtained from step a), to a heating treatment at a temperature of about 101° C. to 160° C. to place the composition impregnated said fabric into a softened thermoplastic state, and optionally allowing the fabric so obtained to cool; and c) optionally forming the fabric obtained from step b) into a desired shape to form a shaped fabric, and optionally allowing the shaped fabric to cool;

said thermoplastic fabric obtained from step b) or c) being thermosettable into a rigid fabric when subjected to a thermosetting treatment at a thermosetting temperature to thermoset the thermoplastic composition impregnated in the fabric in order to rigidify the fabric by cross-linking of the heat resistant fibers or heat resistant fibers of the threads.

According to another embodiment, another method for preparing a rigidified fabric made of heat resistant fibers or made of threads of heat resistant fibers, said method comprising the step of subjecting the thermoplastic fabric as defined hereinabove to a thermosetting treatment by heating it to a thermosetting temperature to thus thermoset the thermoplastic composition impregnated in the fabric in order to rigidify the fabric by cross-linking of the heat resistant fibers or the heat resistant fibers of the threads.

According to another embodiment, a very referred aspect of the fabric of glass fiber that can be used as a starting material to embody the various preferred embodiments of the invention are fabrics made of threads of glass fibers coated with starch. More particularly, said fabric may be selected amongst those listed in the following table:

| Fiberglass filtration product - with starch coating Specification table (metric values) | | | | | | |
|---|---|---|---|---|---|---|
| | Thread Diameter | | Thread | Holes | Opening | | |
| Style Number | Warp mm | Fill mm | Count Per $cm^2$ | Per $cm^2$ | Sizes Per $cm^2$ | Open area % | Weave Type |
| 34L | 0.864 | 0.940 | 34.3 × 29 | 10 | 0.0512 | 50.9 | Leno |
| 34P4 | 0.787 | 1.016 | 37.3 × 31 | 12 | 0.0418 | 48.4 | Plain |
| 36F | 0.686 | 1.118 | 40.9 × 34 | 14 | 0.0321 | 44.6 | Plain |
| 36L | 0.914 | 0.864 | 38.4 × 36 | 14 | 0.0322 | 44.5 | Leno |
| 36P | 0.686 | 0.838 | 40.9 × 37.8 | 15 | 0.0315 | 48.7 | Plain |
| 36P4 | 0.787 | 1.067 | 37.3 × 41 | 15 | 0.0260 | 39.7 | Plain |
| 40F | 0.686 | 1.118 | 40.9 × 37.8 | 15 | 0.0269 | 41.6 | Plain |
| 40L | 0.940 | 0.864 | 43.8 × 36 | 16 | 0.0255 | 40.3 | Leno |
| 40P | 0.686 | 0.838 | 44.9 × 44.4 | 20 | 0.0218 | 43.5 | Plain |
| 40P4 | 0.813 | 0.991 | 36.8 × 34.1 | 13 | 0.0368 | 46.3 | Plain |
| 42F | 0.762 | 1.118 | 44.9 × 38 | 17 | 0.0222 | 37.8 | Plain |
| 42P | 0.737 | 0.864 | 44.9 × 46.5 | 21 | 0.0191 | 40.1 | Plain |
| 43FK | 0.762 | 1.118 | 54 × 42 | 23 | 0.0138 | 31.2 | Plain |
| 43P | 0.737 | 1.864 | 54 × 50.6 | 27 | 0.0124 | 33.9 | Plain |
| 43P4 | 0.889 | 1.168 | 54 × 47 | 25 | 0.0092 | 24.3 | Plain |
| 55F | 0.533 | 0.787 | 65.8 × 56.9 | 37 | 0.0095 | 35.9 | Plain |

According to another embodiment, the product 40L mentioned hereinabove is particularly preferred as starting material for embodying the various preferred embodiments of the invention.

The invention and its advantages will be better understood upon reading the following non-restrictive detailed description thereof.

BRIEF DESCRIPTION OF THE DRAWINGS

The present invention will be better understood with reference to the following drawings.

EXAMPLES

Example 1

A composition according to the invention was prepared as follows:

In a first step, a mixture M was prepared by admixing the following ingredients together in a stainless steel container. More particularly, the ingredients of the mixture consist of:

- Food graded table sucrose (i.e. table sugar) sold by Lantic Inc. under the trade name Lantic (hereinafter called sucrose in the present example).
- Tap water as available from the Applicant's laboratory facilities located in the city of Sherbrooke, Quebec, Canada.
- Laboratory grade phosphoric acid 75% wt. (i.e. a mixture of 75 wt % $H_3PO_4$ and 25 wt % water).
- Calcium phosphate monobasic sold by Spectrum Chemical Mfg. Corp., including $Ca(H_2SO_4).H_2O$.
- Aluminum Ammonium Sulfate—Lab Grade sold by ACP Chemical Inc., including $AlNH_4(SO_4)_2.2H_2O$.
- A 1 kg of mixture M containing
- 55.0 wt % of sucrose;
- 41.5 wt % of tap water;
- 1.1 wt % of phosphoric acid 75% wt.;
- 1.0 wt % aluminium ammonium sulfate; and
- 1.4 gr (1.4 wt %) calcium phosphate monobasic.

was prepared by adding into a stainless steel container, 550 gr of sucrose, 41.5 gr of tap water, 1.1 gr of phosphoric acid 75%, 1.0 gr of aluminum ammonium sulfate, and 1.4 gr of calcium phosphate monobasic, and then mixed together with a paint mixer until obtaining an homogeneous mixture M.

Then, the resulting homogeneized mixture was subjected to heating until a temperature of 100° C. to 103° C. was reached for at least 5 minutes, to thereby form a caramel defining said product A. Said product A was thereafter allowed to cool at room temperature.

In a second step, 515 gr. of a product B which is a colloidal dispersion of submicron-sized silica particles in the form of tiny spheres, in an alkaline aqueous solution and sold under the trademark NALCO 1144®, said NALCO 1144® having the following properties:

| | |
|---|---|
| Colloidal Silica as $SiO_2$: | 40%, |
| pH @ 25° C.: | 9.9, |
| Average particle Diameter: | 14 nm, |
| Specific Gravity: | 1.30, |
| Viscosity: | 15 cP, and |
| $Na_2O$ | 0.45%; | was added to the 1.0 kg of the product A obtained in the previous step, and then ingredients A and B were mixed together with said paint mixer. The mixing was carried out at room temperature until an homogeneous composition was obtained (i.e. about 10 minutes). Said composition was comprising about 66 wt % of the product A and about 34 wt % of the product B.

Example 2

A fabric 107 (see FIG. 2) of glass fibers that is substantially free of a sizing material consisting of starch was prepared.

Figure 1:
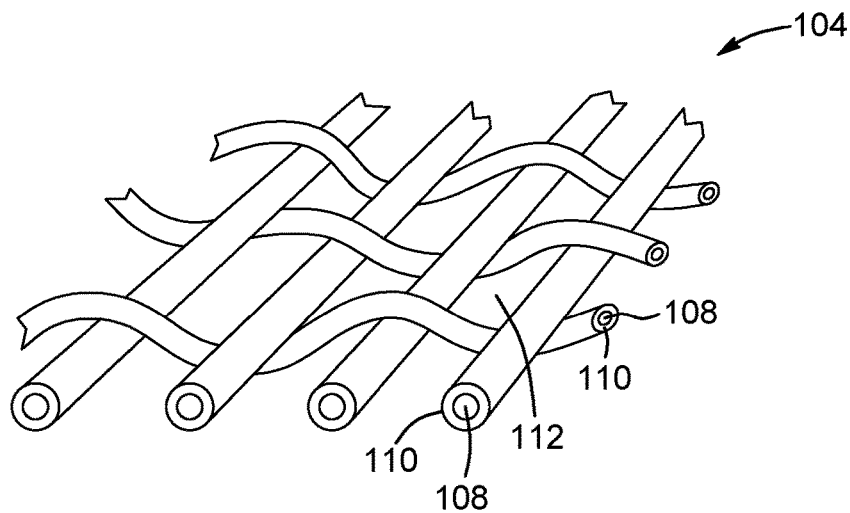
FIG. 1: a partial view of a network of a fabric of threads of glass fibers, said threads being provided with a sizing material, according to the prior art.
Figure 2:
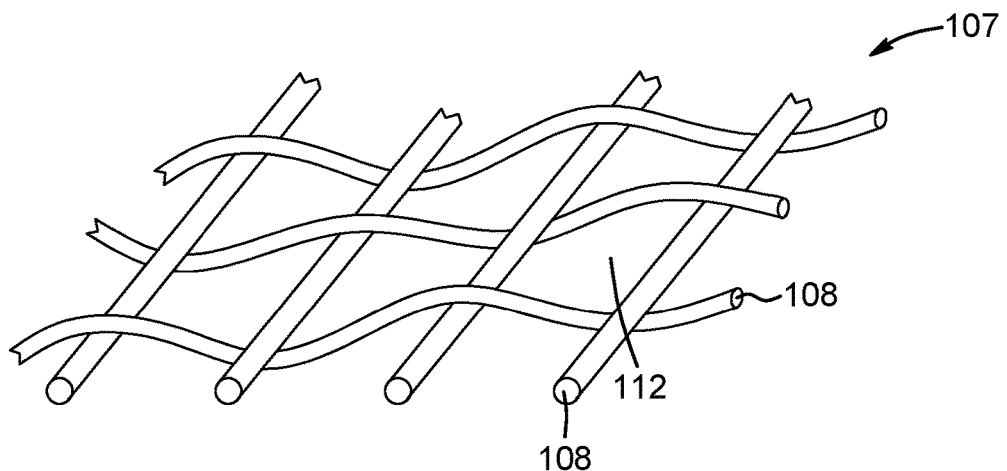
FIG. 2: a partial view of a network of a fabric of threads of glass fibers, after having removed the sizing material (i.e. devoided of sizing material)

More particularly, a fabric 104 of glass fibers (see FIG. 1) consisting of E-Glass threads 108 coated with a layer 110 of starch (as a sizing agent) was subjected to a heat treatment in an oven at 450° C. for about 2 minutes, to burnout said starch (in the presence of oxygen) and thereby remove the sizing agent. FIG. 1 represents the fabric 104 with the threads 108 coated with the layer 110 of starch, and the FIG. 2 represents the fabric 107 with the threads 108. Fabrics 104 and 107 are provided with openings 112. More particularly, the fabric 104 is of the type 40L as defined hereinabove.

Example 3

A rigidified, thermoplastic fabric of glass fibers was prepared according to a method wherein a fabric of glass fibers as obtained from example 2 was impregnated with the composition as defined in example 1, to thus obtain a fabric impregnated with said composition.

Figure 3:
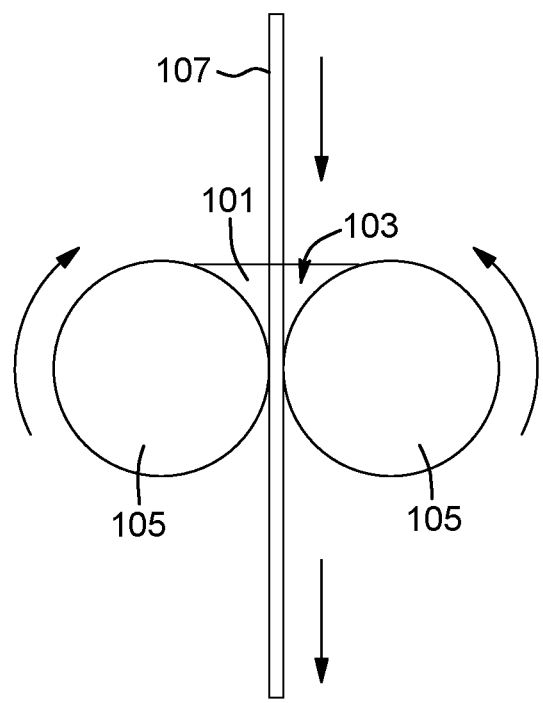
FIG. 3: a schematic view of a two-rollers impregnator to impregnate a fabric of FIG. 2 with a liquid composition according to the invention.

More particularly, the fabric was successively passed in the a reservoir containing said composition and then between a pair of opposite rubber-rolls of a two-rollers impregnator, as schematically illustrated in the enclosed FIG. 3. Said two-rollers impregnator is well known to skilled workman and does not need to be explained in details.

Figure 10:
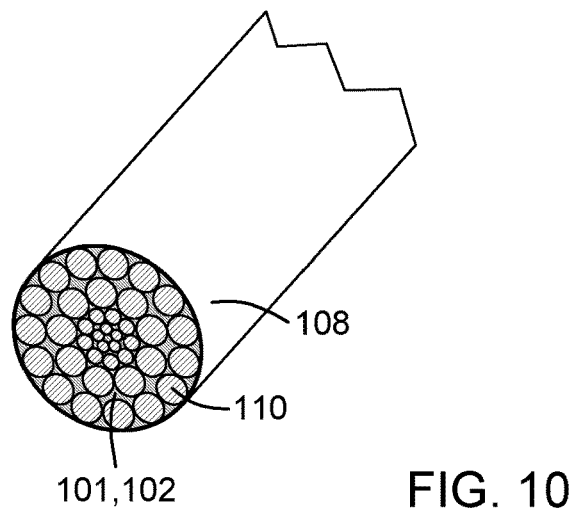
FIG. 10: a partial cross sectional perspective view of a thread of the fabric of FIG. 9, when impregnated with the composition according to the invention.

More particularly, according to the present example, it is to be noted that a composition 101 was contained in a reservoir 103 located above a pair of rubber-rolls 105. The fabric 107 was passed successively across the composition 101 and then between the pair of opposite rubber-rolls 105, which are pressed one against the other, to push an amount of the composition within the openings of the fabric 107. Then, while exiting the rubber-rolls 103, the pressure against the fabric 107 was stopped, an amount of the composition 101 pushed within the opening 102 (see FIG. 10) of the threads 108 of the fabric was retained within said openings of the fabric 107 (e.g. by capillary suction) thereby leaving surfaces of the fabric substantially depleted of excess amount of the composition, and another amount of the composition not retained within the fabric, was adhered to the rubber-rolls and returned to the reservoir 103.

The impregnated fabric so obtained was then subjected to a heating treatment in a continuous oven at a temperature of about 160° C. for about 2 minutes to place the composition impregnated therein into a softened thermoplastic state.

Then, the thermosettable fabric so obtained (i.e. impregnated with the composition transformed into a thermoplastic state) was ready to be used for further treatments such as an optional forming the thermoplastic fabric into a desired size and/or shape, and then a thermosetting treatment to thermoset the composition and provide a rigidified fabric by cross-linking of the heat resistant glass fibers. If not used immediately, the fabric may be allowed to cool at room temperature.

Example 4

The fabric impregnated with the composition obtained from example 3, was cut into a piece of 7 inches×48 inches, and then was subjected to a thermosetting treatment in an oven at 450° C. for 2 minutes, in order to rigidify the fabric by cross-linking of the glass fibers.

Then, the rigidified fabric so obtained can be used as a filter for liquid metal as such liquid aluminum or aluminum alloy. This rigidified fabric which originates from a 40L type fabric of glass fiber as defined hereinabove, is provided with openings of 0.0255 $cm^2$. When used for the filtration of liquid aluminum, this filter showed to be as efficient as those of the prior art without the drawbacks.

Example 5

The thermoplastic fabric obtained from example 3, cooled at room temperature, was cut into a piece of 3 inches×3 inches and then placed in a hot mold consisting of a pair of opposite mold halves, to thereby soften and mold the piece of fabric into a desired shape by compression-moulding. Then, the shaped fabric was allowed to cool.

Then, the shaped fabric so obtained was ready to be used for further treatments such as a thermosetting treatment to thermoset the composition and provide a rigidified fabric by cross-linking of the heat resistant glass fibers.

Example 6

The shaped fabric obtained from example 5, was subjected to a thermosetting treatment in an oven at 450° C. for 2 minutes, in order to rigidify the fabric by cross-linking of the glass fibers of the threads.

Then, the shaped rigidified fabric so obtained can be used as a filter for liquid metal as such liquid aluminum or aluminum alloy, especially in a low pressure casting process. This shaped rigidified fabric which originates from a 40L type fabric of glass fiber as defined hereinabove, is provided with openings of 0.0255 $cm^2$. When used for the filtration of liquid aluminum, this filter showed to be as efficient as those of the prior art made of metallic threads, without the drawbacks.

Example 7

The fabric obtained from example 3 was cut into a piece of 3 inches×3 inches, and while being still in a softened thermoplastic state, placed in a cold mold consisting of a pair of opposite mold halves, to thereby obtain a fabric into a desired shape by compression-moulding.

Then, the shaped fabric so obtained was subjected to a thermosetting treatment in an oven at 450° C. for 2 minutes, in order to rigidify the fabric by cross-linking of the glass fibers.

Thereafter, the shaped rigidified fabric so obtained can be used as a filter for liquid metal as such liquid aluminum or aluminum alloy, especially in a low pressure casting process. When used for the filtration of liquid aluminum, this filter showed to be as efficient as those of the prior art made of metallic threads, without the drawbacks.

Of course, alternatively, if the fabric obtained from example 3 had cooled at room temperature, said fabric may be reheated to the softened thermoplastic state by any appropriate means.

Example 8

Figure 9:
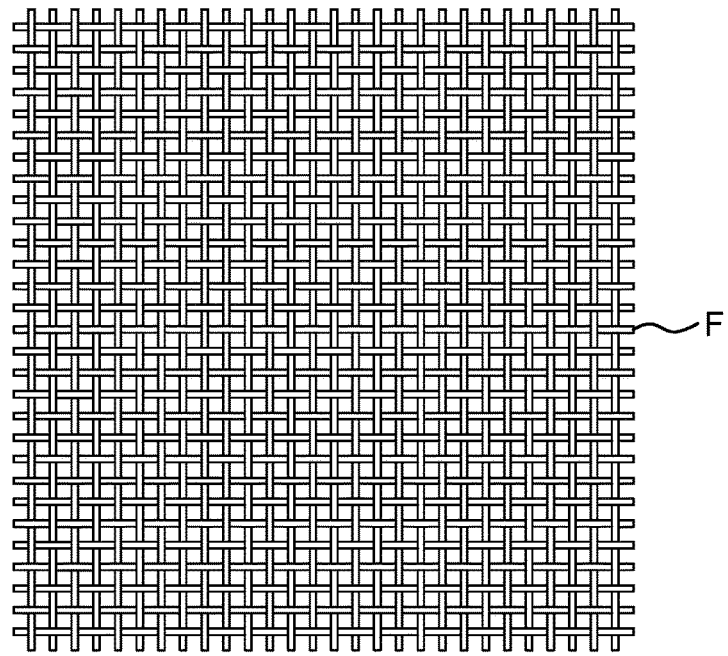
FIG. 9: a view of a thermoplastic fabric as obtained from FIG. 3.

A rigidified fabric of glass fibers F was prepared according to a method wherein a fabric 107 of threads 108 of glass fibers 110 (see FIGS. 9 and 10) as obtained from example 2 was impregnated according to example 3 with the composition 101 defined in example 1, to thus obtain a fabric impregnated with said composition.

More particularly, and according to the present example and with reference to FIG. 3, a composition 101 was contained in a reservoir 103 located above a pair of rubber-rolls 105. The fabric 107 was passed successively across the composition 101 and then between the pair of opposite rubber-rolls 105, which are pressed one against the other, to push an amount of the composition within the openings existing between fibers of the threads 108 forming the fabric 107. Then, while exiting the rubber-rolls 103, the pressure against the fabric 107 was stopped, an amount of the composition 101 pushed within the openings of the threads 108 was retained within said threads (e.g. by capillary suction) thereby leaving surfaces of the fabric substantially depleted of excess amount of the composition, and another amount of the composition not retained within the fabric, was adhered to the rubber-rolls and returned to the reservoir 103.

The impregnated fabric so obtained was then subjected to a heating treatment in a continuous oven at a temperature of about 160° C. for about 2 minutes to place the composition impregnated therein into a softened thermoplastic state.

Then, the fabric F so obtained (i.e. impregnated with the composition transformed into a thermoplastic state) was ready to be used for further treatments such as an optional forming the thermoplastic fabric into a desired size and/or shape, and then a thermosetting treatment to thermoset the composition and provide a rigidified fabric by cross-linking of the heat resistant glass fibers of the threads. If not used immediately, the fabric may be allowed to cool at room temperature.

Example 9

The fabric F obtained from example 8 and cooled at room temperature, was cut into a piece of 3 inches×3 inches and then placed in a hot mold consisting of a pair of opposite mold halves, to thereby soften and mold a filtration device 201a (see FIGS. 6 and 7) having a particular structural shape and orientation, by compression-moulding. Then, the shaped fabric was allowed to cool. Compression moulding is carried out at about 160° C.

Then, the shaped fabric so obtained was ready to be used for further treatments such as a thermosetting treatment to thermoset the composition and provide a rigidified fabric by cross-linking of the heat resistant glass fibers of the threads of glass fibers.

Example 10

The fabric F obtained from example 8 was cut into a piece of 3 inches×3 inch, and while being still in a softened thermoplastic state, placed in a cold mold consisting of a pair of opposite mold halves, to form a filtration device 201a (see FIGS. 4 and 5) having a particular structural shape and orientation, by compression-moulding. Compression moulding is carried out at about 150° C.

Then, the filtration device 201a was subjected to a thermosetting treatment in an oven at 450° C. for 2 minutes, in order to rigidify the fabric by cross-linking of the glass fibers. Of course, alternatively, if the fabric obtained from example 8 had cooled at room temperature, said fabric may be reheated to the softened thermoplastic state by any appropriate means for moulding, and then subjected to the thermosetting treatment. This filtration device 201a made of said rigidified fabric, which originates from a 40L type fabric of glass fiber as defined hereinabove, is provided with openings of 0.0255 cm$^2$.

Figure 7:
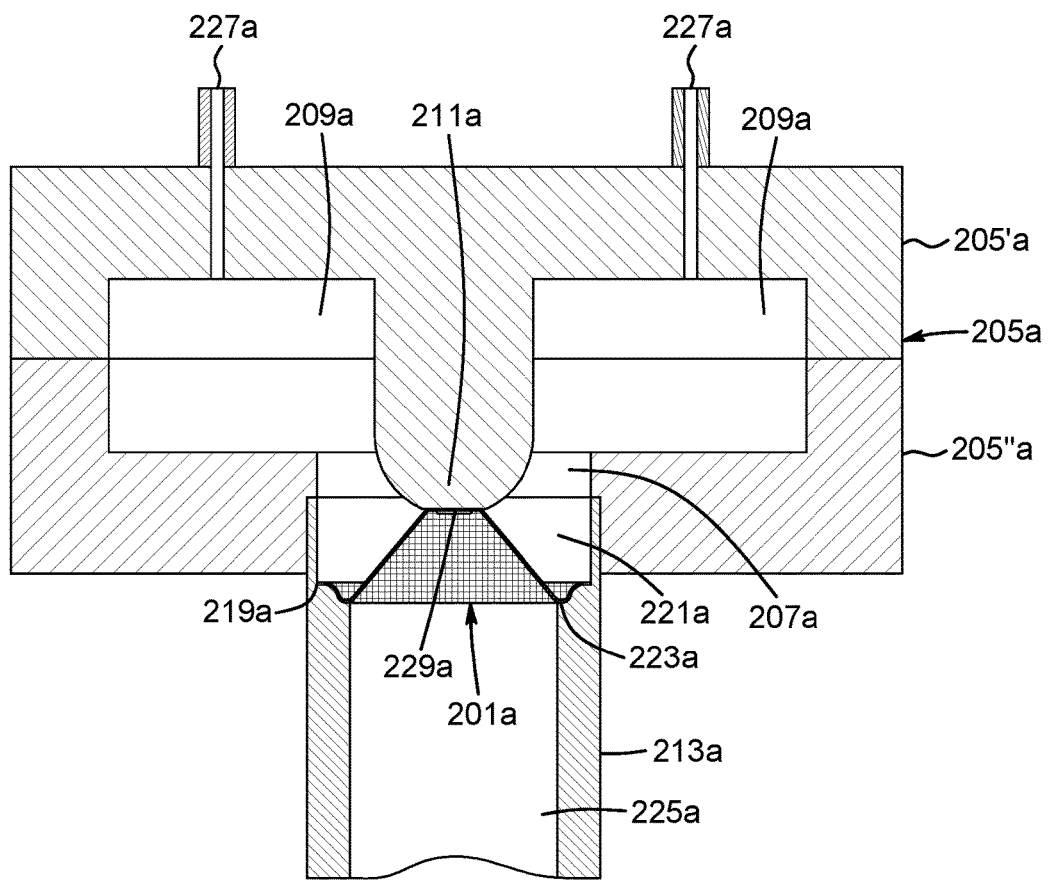
FIG. 7: a partial schematic illustration of the filtration device of FIGS. 4 to 6 positioned in a low pressure casting installation, between a seat portion of an upper end of a rising tube and a diffuser positioned at a filling inlet of a mold (according to the invention)
Figure 8:
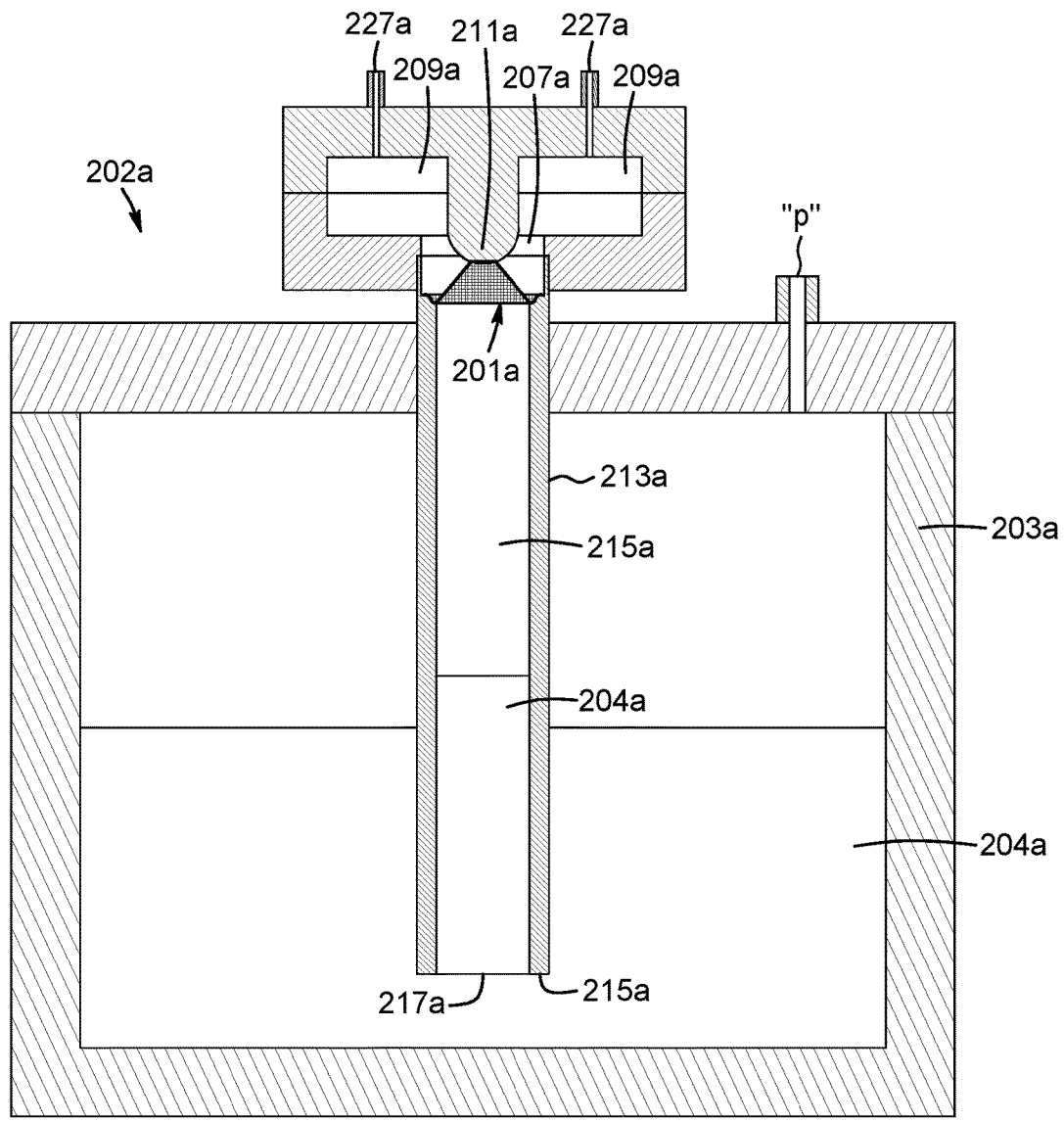
FIG. 8: a schematic illustration of a low pressure casting installation with the filtration device illustrated in FIGS. 4 to 7.

With reference to FIGS. 7 and 8, the filtration device 201a can be used in a low pressure casting installation 202a comprising:

an air tight reservoir 203a containing a liquid aluminum alloy 204a;
a mold 205a, preferably made from a pair of opposite parts 205'a and 205'a, the part 205"a being mobile to allow an easy removal of the molded article, said mold 205a being provided with a filing inlet 207a, a cavity 209a and a diffuser 211a mounted across the filling inlet 207a;
the filtration device 201a;
a rising tube 213a having
  a lower end 215a provided with a lower opening 217a immerged into the liquid aluminum alloy thereof contained in the reservoir,
  an upper end 219a provided with an upper opening 221a connectable with the filing inlet 207a of the mold 205a and provided with a seat portion 223a surrounding the upper opening 221a, and
  a rising channel 225a connecting the lower opening and the upper opening 221a, in order to place the reservoir and the filling inlet 207a of the mold in fluid communication when the upper opening 221a is connected with the filing inlet 207a, and the filtration device 201a contacted by the diffuser 211a; and
a source of pressurized air "P" entering 205a into the reservoir 203a to displace the liquid aluminum alloy from the reservoir, through the rising channel 225a of the rising tube 213a, the filtration device 201a and the filing inlet 207a, to fill the cavity 209a. After cooling of the liquid aluminum alloy contained in the cavity 209a to form the molded article, and removal of the same form the cavity 209a, the resulting article is provided with the filtration device trapped in a protrusion. The air initially contained in the cavity 209a is evacuated via openings 227a.

The diffuser 211a applies a slight pressure against the main portion 257a of the filtration device 201a, in order to help maintaining the filtration device 201a in place during the priming of the same. Indeed, it is well known that the during the priming phase of a filter, the pressure applied by the liquid starting to flow there through is greater and then said pressure falls when the flow of liquid is established.

Figure 4:
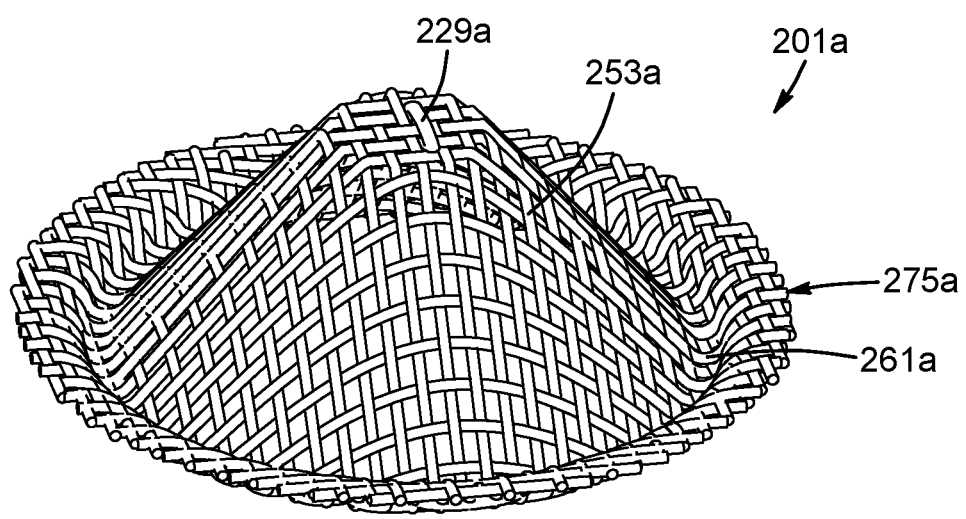
FIG. 4: a perspective view of a filtration device according to the invention.
Figure 5:
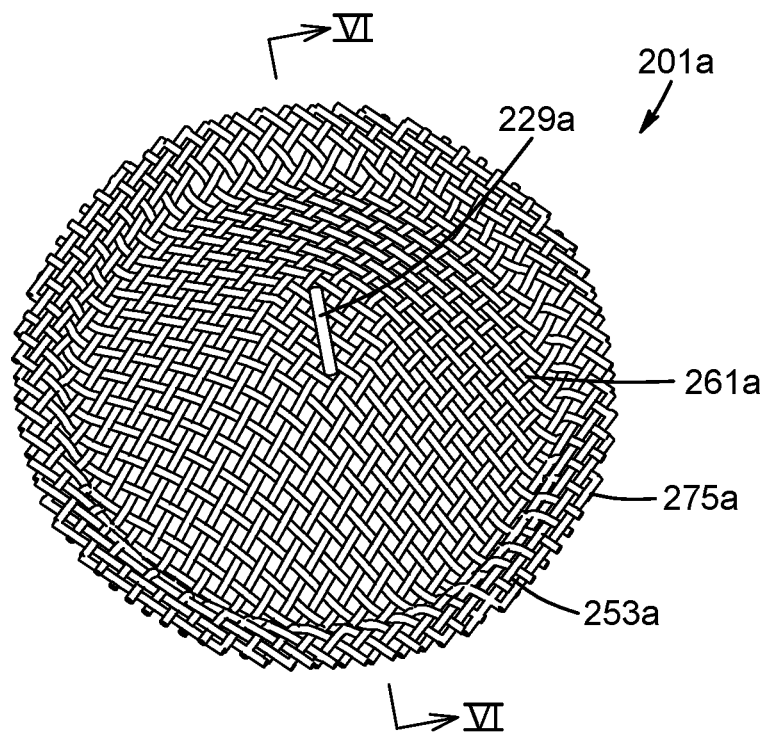
FIG. 5: a top plan view of the filtration device of FIG. 4.
Figure 6:
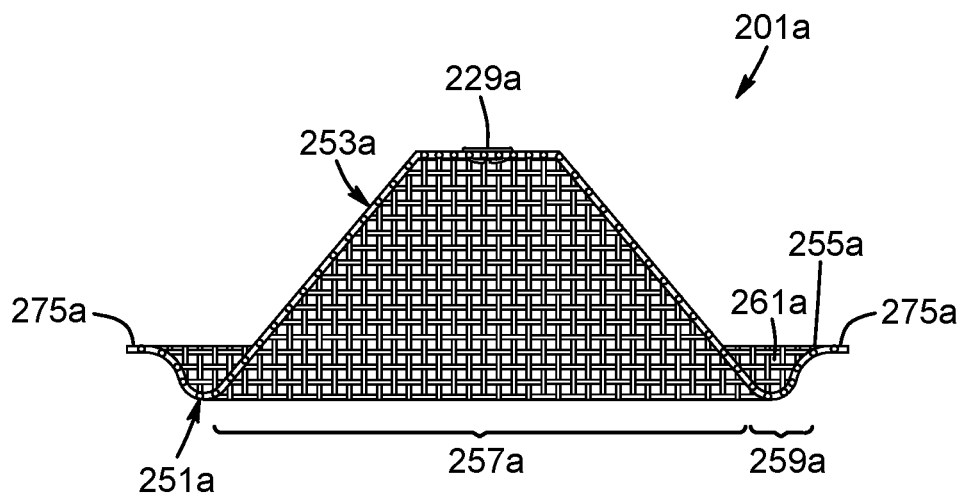
FIG. 6: a cross sectional view of filtration device of FIG. 5, according to line V-V.

More particularly, with reference to FIGS. 4 to 6, the filtration device 201a is made of at least one ply of a fabric of rigidified heat resistant fibers. This filtration device 201a comprises a lower face 251a, an upper face 253a, a peripheral edge 255a, a main portion 257a, and a peripheral portion 259a surrounding the main portion. The main portion 257a and a part of the peripheral portion 259a are to be positioned across the upper opening 221a. The peripheral portion 259a forms a concave cavity 261a at the upper face 253a and a convex rim at the lower face 251a, said convex rim 261a being oriented downwardly, the upper face of the main portion 257a is positioned against the diffuser 211a, and the peripheral portion 259a being in part positioned against the seat portion 223a.

More particularly, with reference to FIGS. 4 to 6, the filtration device 201a is further provided with a ridge portion 275a. This ridge portion 275a further reinforce the stiffness of the resulting filtration device to minimize the risk of having the filtration device 201a deformed under the pressure of a liquid metal or alloy passing there through. Also, this ridge portion, which can extend horizontally as illustrated or at an angle, is designed to rest on a corresponding portion of the seat portion 223a. This ridge portion 275a contributes to make easier the correct centering of the filtration device in the mold and/or rising tube.

Optionally, at the center of the main portion 257a, a stainless steel 229a staple can be provided. This staple 229a allows the handling of the filtration device 201a with a tool provided with a magnet, for an easy positioning of the peripheral portion 259a and ridge portion 275a against a corresponding seat portion 223a (especially with a magnetic tool and more preferably with a magnetic tool operated by a robot). Also, the presence of the staple 229a allows to confirm the proper positioning of the filtration device 201a against the seat portion 223a (e.g with X-rays devices).

The particular structure and orientation of the filtration device 201a in the low pressure casting installation 202a allows to efficiently filter the liquid aluminum alloy before filling of the cavity 209a. More particularly, said filtration device 201a showed to be as efficient as those of the prior art made of metallic threads, without the drawbacks.

Example 11

Figure 11:
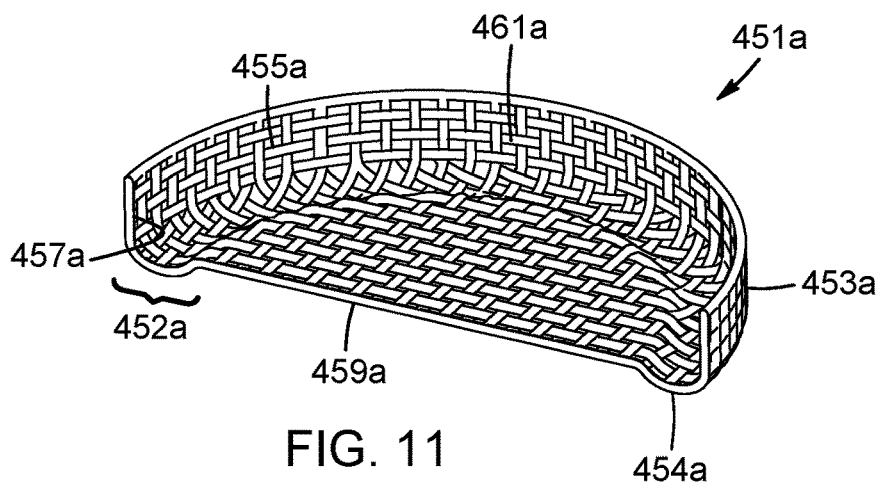
FIG. 11: a partial perspective view of a first basket according to the invention.
Figure 13:
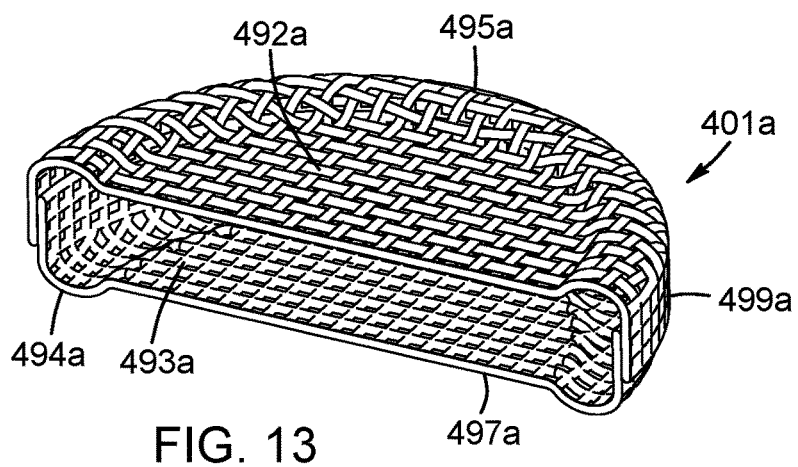
FIG. 13: a partial perspective view of a filtration body comprising the first basket and the second basket to define a new filtration device according to the invention.

A piece of the fabric (see FIG. 9) obtained from example 8, cooled at room temperature, was cut into a piece of 3 inches×3 inches and then placed in a hot mold consisting of a pair of opposite mold halves, to thereby soften and mold a first basket 451a (see FIG. 11) having a particular structural shape and orientation, by compression-moulding. Then, the exceeding fabric is removed by any appropriate cutting means (e.g. scissors, a knife, etc.) and allowed to cool. The compression moulding was carried out at 150° C.

The first basket 451a has an outer wall 453a and a cavity 455a defined by an inner wall 457a, an end wall 459a and an opening opposite 461a to the end wall 459a.

Figure 12:
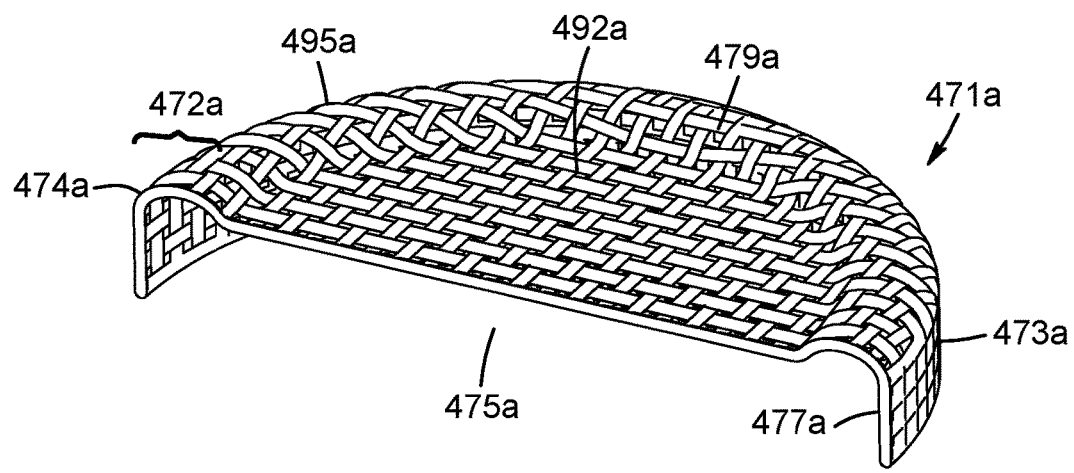
FIG. 12: a partial perspective view of a second basket according to the invention.

Then, another piece of the fabric obtained from example 8, cooled at room temperature, was cut into a piece of 3 inches×3 inches and then placed in a hot mold consisting of a pair of opposite mold halves, to thereby soften and mold a second basket 471a (see FIG. 12) having a particular structural shape and orientation, by compression-moulding. Then, the exceeding fabric is removed by any appropriate cutting means (e.g. scissors, a knife, etc.) and allowed to cool. The compression moulding was carried out at 150° C.

The second basket 471a has an outer wall 473a and a cavity 475a defined by an inner wall 477a, an end wall 479a and an opening opposite to the end wall 479a.

Figure 14:
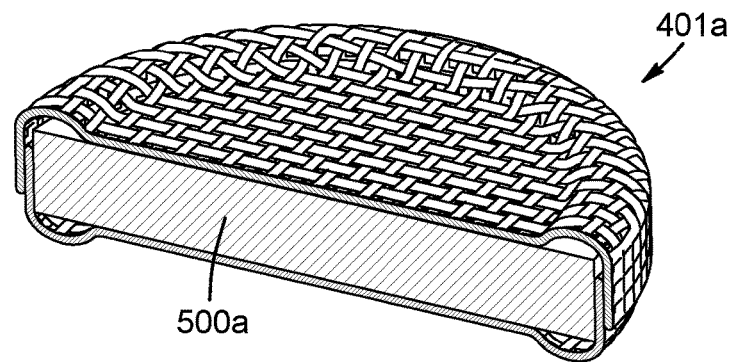
FIG. 14: a partial perspective view of a filtration device where the filtration body comprises the first basket and the second basket, and a filtration pad housed within a cavity of the filtration body.

The opened end of the first basket 451a is housed within the cavity 475a of the second basket 471a to define a filtration device 401a having a structural shape and orientation and being provided with a cavity 493a, an upper face 495a, a lower face 497a, and a side face 499a. Optionally, as illustrated in FIG. 14, the filtration device 401a is optionally further provided with a filtration pad 500a housed within said cavity 493a.

The end wall 459a of the first basket 451a corresponds to the lower face 493a of the filtration body 401a, and the end wall 479a of the second basket 471a corresponds to the upper face 495a of the filtration body 401a. The outer wall 453a of the first basket 451a is sized to be friction fit against the inner wall 477a of the second basket 471a, the outer wall 453a of the second basket 471a corresponds at least in part to the side face 499a of the filtration body 491a (i.e. the filtration device 401a). Alternatively, the outer wall 479a of the second basket 471a can be sized to be friction fit against the inner wall 457a of the first basket 451a, the outer wall 473a of the first basket 471a corresponds at least in part to the side face 499a of the filtration body 491a (i.e. the filtration device 401a).

Then upper face 495a of the filtration device 401a has a main portion 492a and the lower face 497a of the filtration device 401a has a peripheral portion 494a, said main portion 495a being for positioning against a diffuser 411a positioned across a filling inlet 407a of a mold of the low pressure casting installation 402a; and said peripheral portion 494a is for positioning across an upper opening 421a of a rising tube 413a of a low pressure casting installation 402a, said peripheral portion 494a being oriented for positioning against a seat portion 423a of the rising tube 413a surrounding the upper opening 421a.

The first basket and the second basket are each provided with a structural feature that allow to further prevent the filtration device 401a to be deformed by the pressure of a flow of liquid metal or alloy passing there through. More particularly, the first basket 451a has a bottom portion and side portion joined by a peripheral portion 452a forming a rim 454a; and the outer wall of the second basket 471a has a top portion and a side portion joined by a peripheral portion 472a forming a rim 474a.

Then, the filtration device 401a so obtained, which is still in a thermoplastic stage, was ready for further treatments such as a thermosetting treatment to thermoset the composition and provide the filtration device 401a made of a rigidified fabric by cross-linking of the heat resistant glass fibers which forming the threads of the fabric. Preferably, the thermoset filtration device 401a is prepared by submitting the thermoplastic filtration device to a thermosetting treatment in an oven at 450° C. for 2 minutes, in order to rigidify the fabric by cross-linking of the glass fibers forming the threads of the fabric.

Then the filtration device 401a is ready for use for filtering a liquid metal as such liquid aluminum or aluminum alloy, especially in a low pressure casting process. As this filtration device 401a was made of said rigidified fabric, which originates from a 40L type fabric of glass fiber as defined hereinabove, is provided with openings of 0.0255 cm². When used for the filtration of liquid aluminum, this filtration device 401a showed to be as efficient as those of the prior art made of metallic threads, without the drawbacks.

Figure 15:
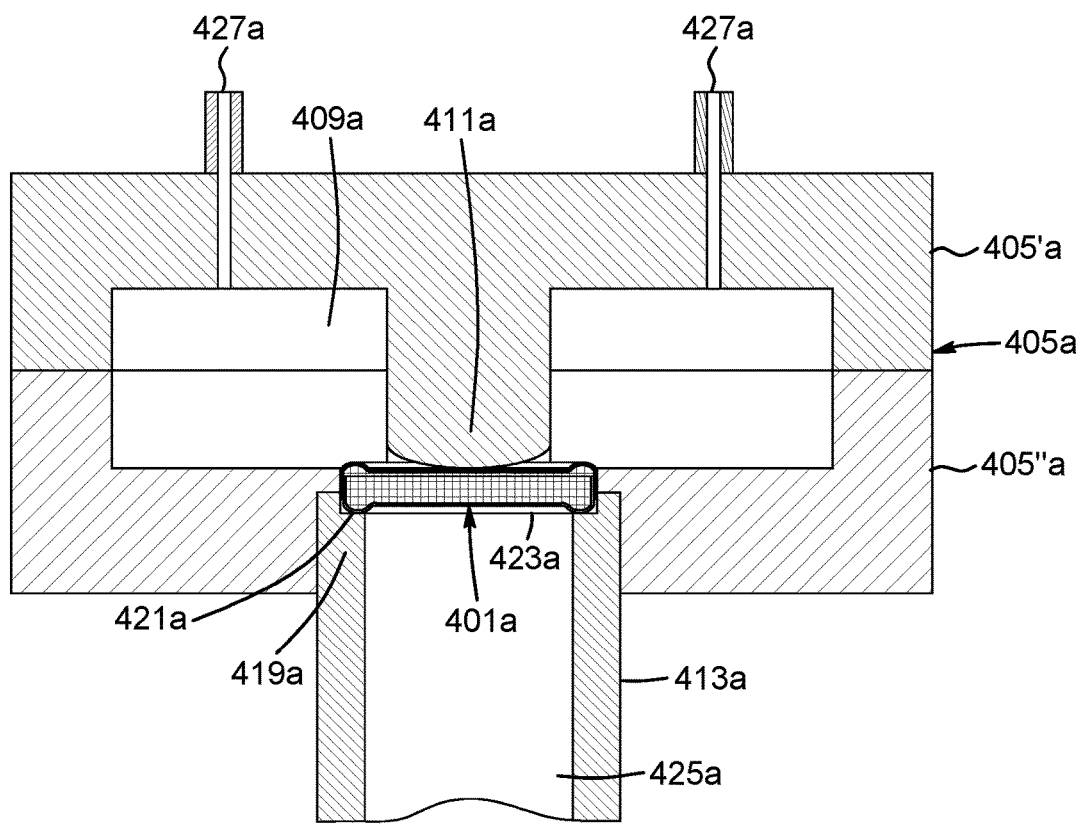
FIG. 15: a partial schematic illustration of the filtration device of FIG. 13 positioned in a low pressure casting installation, between a seat portion of an upper end of a rising tube and a diffuser positioned at a filling inlet of a mold (according to the invention)
Figure 16:
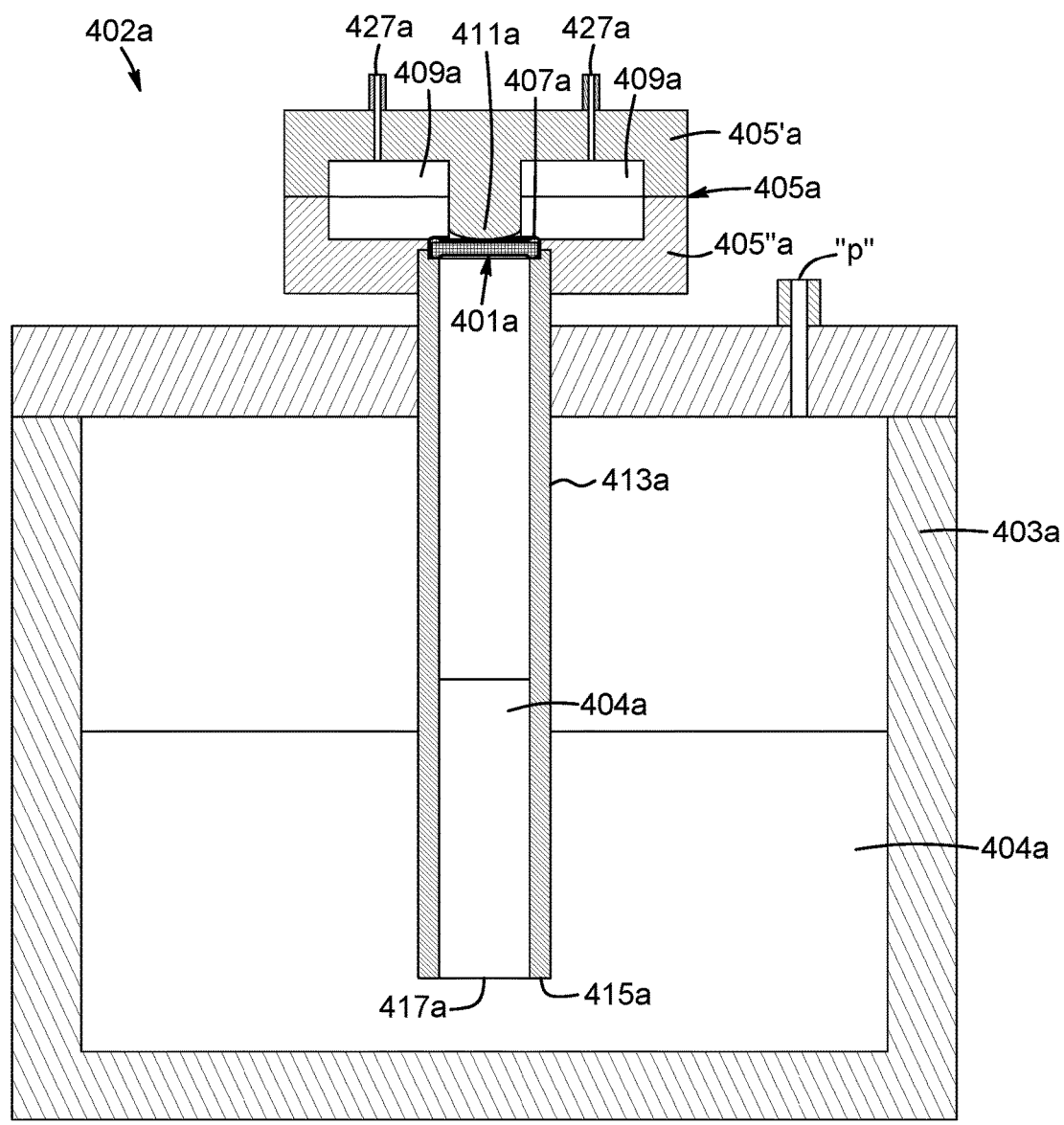
FIG. 16: a schematic illustration of a low pressure casting installation with the filtration device illustrated in FIG. 13.

More particularly, referring to FIGS. 15 and 16, the filtration device 401a can be used in a low pressure casting installation 402a comprising:
  an air tight reservoir 403a containing a liquid aluminum alloy 404a;
  a mold 405a, preferably made from a pair of opposite parts 405'a and 405'a, the part 405"a being mobile to allow an easy removal of the molded article, said mold 405a being provided with a filing inlet 407a, a cavity 409a and a diffuser 411a mounted across the filling inlet 407a;
  the filtration device 401a;
  a rising tube 413a having
    a lower end 415a provided with a lower opening 417a immerged into the liquid aluminum alloy thereof contained in the reservoir,
    an upper end 419a provided with an upper opening 421a connectable with the filing inlet 407a of the mold 405a and provided with a seat portion 423a surrounding the upper opening 421a, and
    a rising channel 425a connecting the lower opening and the upper opening 421a, in order to place the reservoir and the filling inlet 407a of the mold in fluid communication when the upper opening 421a is connected with the filing inlet 407a, and the filtration device 401a contacted by the diffuser 411a; and
  a source of pressurized air "P" entering 405a into the reservoir 403a to displace the liquid aluminum alloy from the reservoir, through the rising channel 425a of the rising tube 413a, the filtration device 401a and the filing inlet 407a, to fill the cavity 409a. After cooling of the liquid aluminum alloy contained in the cavity 409a to form the molded article, and removal of the same form the cavity 409a, the resulting article is provided with the filtration device trapped in a protrusion. The air initially contained in the cavity 409a is evacuated via openings 427a.

The diffuser 411a applies a slight pressure against the main portion 457a in order to help maintaining the filtration device 401a in place during the priming of the same. Indeed, it is well known the during the priming phase of a filtration device, the pressure applied by the liquid starting to flow through said filtration device is greater, and then said pressure falls when the flow of liquid is established. As mentioned above, when used for the filtration of liquid aluminum, this filtration device 401a showed to be as efficient as those of the prior art made of metallic threads, without the drawbacks.

Example 12

The fabric obtained from example 3 was cut into a piece of 5 inches×2½ inches, and while being still in a softened thermoplastic state, placed in a cold mold consisting of a pair of opposite mold halves, to thereby obtain a fabric into a desired shape by compression-moulding. The fabric so obtained was «M» shaped.

Then, the «M» shaped fabric so obtained was subjected to a thermosetting treatment in an oven at 450° C. for 2 minutes, in order to rigidify the fabric by cross-linking of the glass fibers.

Thereafter, the shaped rigidified fabric so obtained can be used as a filter for liquid metal as such liquid aluminum or aluminum alloy, especially in a gravity casting process.

Of course, alternatively, if the fabric obtained from example 3 had cooled at room temperature, said fabric may be reheated to the softened thermoplastic state by any appropriate means.

Example 13

The fabric obtained from example 3 was cut into a piece of 5 inches×2½ inches, and while being still in a softened thermoplastic state, placed in a hot mold consisting of a pair of opposite mold halves, to thereby obtain a fabric into a «M» shape by compression-molding. The shaped fabric so obtained was «M» shaped.

Then, the «M» shaped fabric was subjected to a thermosetting treatment in an oven at 450° C. for 2 minutes, in order to rigidify the fabric by cross-linking of the glass fibers.

Figure 21:
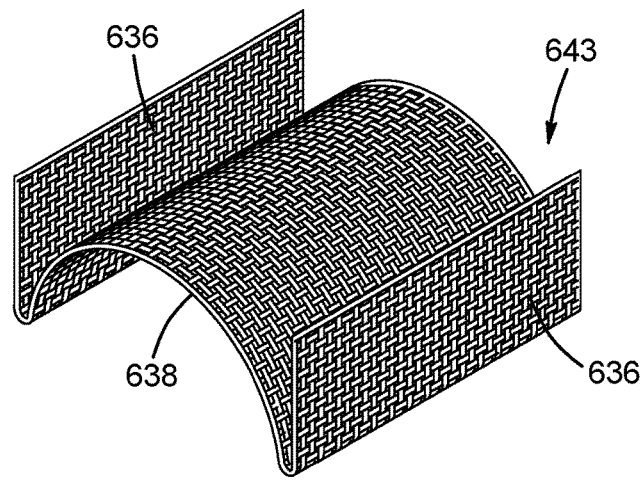
FIG. 21: a rigidified fabric filtration device having a «M» shape.
Figure 22:
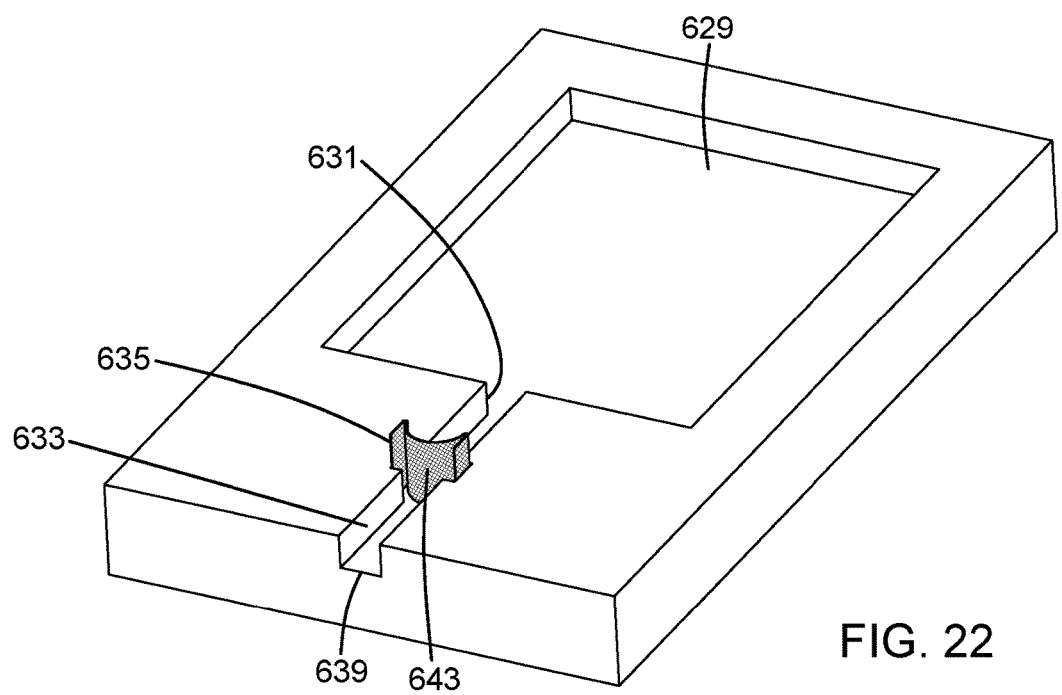
FIG. 22: a schematic perspective view of one part of the two-part mold with the «M» shape filer of FIG. 21 (according to the invention).

Thereafter, the «M» shaped rigidified fabric 643 (see FIG. 21) so obtained can be used as a filter for liquid metal as such liquid aluminum or aluminum alloy, especially in a gravity casting process.

Example 14

Figure 17:
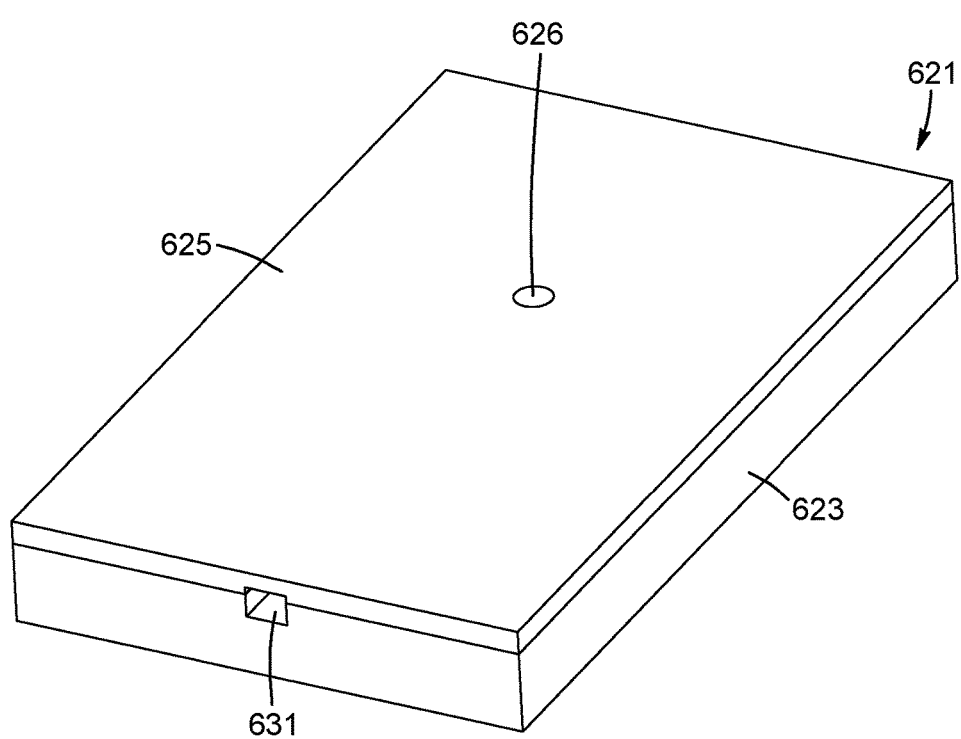
FIG. 17: a schematic perspective view of a two-part mold.
Figure 18:
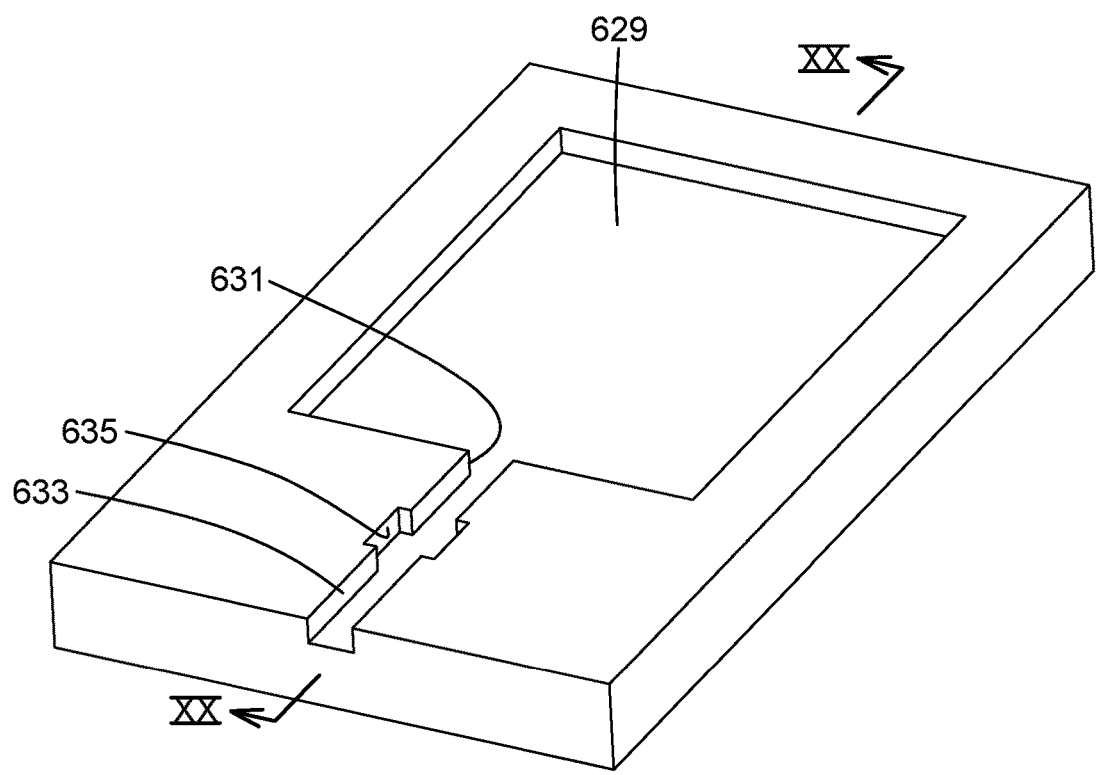
FIG. 18: a schematic perspective view of one part of the two-part mold.

This example illustrates the casting of an article made of aluminum in a two-part mold 621. This two-part mold 621 comprises a part 623 and a part 625 (see FIGS. 17 and 18) which are each provided with a cavity defining when both parts are pressed one against the other, a mold cavity 629, a cavity filing inlet 631, a mold conduit 633 and a mold housing 635. The mold conduit 633 has an opening 637 and an opening 639, the opening 639 being in fluid communication with the mold cavity 629. The part 625 is further provided with an opening 626 allowing the air contained within the mold cavity 629 to escape during the filling of said mold cavity 629 with liquid aluminum.

Figure 19:
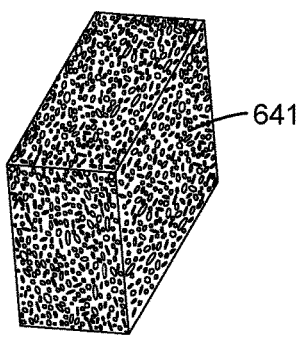
FIG. 19 a perspective view of a ceramic foam filter according to the prior art.
Figure 20:
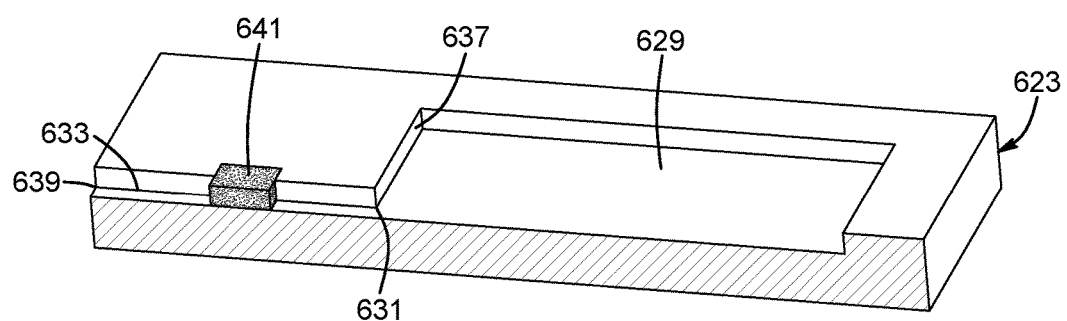
FIG. 20: a cross sectional perspective view according to XIIIV-XIIIV of the part of mold of FIG. 18 with a ceramic foam filter positioned in the housing (prior art)

As illustrated in FIGS. 19 and 20, according to prior art, a ceramic foam filter 641 which was commonly used in prior art molding process. Said ceramic foam filter 641 was a monolithic parallelepiped and occupied the entirety of the capacity defined by the housing 635.

In the present example, said ceramic foam filter 641 was replaced by a «M» shape filter 643 as obtained from example 13. More particularly, the «M» shape filter 643 was of such size to have its volume is completely housed within the mold housing 635, with parallel branches 636 substantially coplanar with opposite wall 635a of the housing 635 and the tip of the arch 638 of the «M» oriented opposite to the mold cavity 629.

Then, liquid aluminum was poured in the opening 637 to flow through the conduit 633, the «M» shape filter positioned in the housing 635, and cavity filing inlet and the cavity 629 itself. More particularly, this process of pouring liquid aluminum into the mold is called gravity casting process.

Then, once the liquid aluminum has cool, both parts of the two-part mold are separated and the solid article is removed.

The portion of the solid article corresponding to the conduit 633, the housing 635 and containing the «M» shape filter 621 was separated from the finished article and recovered for recycling purposes. The «M» shape filter reveals to be efficient without the drawbacks of ceramic foam filters.

The present invention has been described with respect to its preferred embodiments. The description and the drawings are only intended to aid to the understanding of the invention and are not intended to limit its scope. It will be clear to those skilled in the art that numerous variations and modifications can be made to the implementation of the invention without being outside the scope of the invention. Such variations and modifications are covered by the present invention. The invention will be now described in the following claims:

The invention claimed is:

1. A filtration device for filtering a liquid metal or an alloy thereof,
    wherein the filtration device has a lower face, an upper face, a peripheral edge, a main portion, and a peripheral portion surrounding the main portion, the peripheral portion being shaped to form a concave cavity at the upper face and a convex rim at the lower face,
    wherein the peripheral portion is further provided with a ridge portion surrounding the peripheral portion, and
    wherein the filtration device is made of a rigidified fabric comprising a plurality of heat resistant fibers or a plurality of threads of heat resistant fibers, impregnated with a composition consisting essentially of a mixture of a product A and a product B:
        the product A being obtained by polymerisation of saccharide units contained in a mixture consisting essentially of the saccharide units, water and at least one additive selected from the group consisting of acids, inorganic wetting agents, and acid phosphate adhesives; and
        the product B consisting of at least one inorganic colloidal binding agent,
    the composition being in a thermoset stage.

2. The filtration device according to claim 1, wherein the main portion is a dome having its summit oriented toward the upper face.

3. The filtration device of claim 2, further provided with an insert made of a magnetisable material for handling of the filtration device with a tool provided with a magnet.

4. The filtration device of claim 3, wherein the heat resistant fibers are glass fibers, silica fibers or a mixture thereof, and wherein the product A is obtained by caramelization of a mixture M comprising sucrose, water, and optionally at least one additive selected from the group consisting of acids, inorganic wetting agents and acid phosphate adhesives.

5. The filtration device according to claim 1, wherein the main portion has a frustoconical shape having its summit oriented toward the upper face.

6. The filtration device of claim 5, further provided with an insert made of a magnetisable material for handling of the filtration device with a tool provided with a magnet.

7. The filtration device of claim 6, wherein the heat resistant fibers are glass fibers, silica fibers or a mixture thereof, and wherein the product A is obtained by caramelization of a mixture M comprising sucrose, water, and optionally at least one additive selected from the group consisting of acids, inorganic wetting agents and acid phosphate adhesives.

8. A filtration device for filtering a liquid metal or an alloy thereof, wherein the filtration device comprises a first basket and a second basket,
    wherein the first basket has an outer wall and a cavity defined by an inner wall, an end wall and an opening opposite to the end wall,
    wherein the second basket has an outer wall and a cavity defined by an inner wall, an end wall and an opening opposite to the end wall,
    wherein the opened end of the first basket is housed in the cavity of the second basket to define a filtration body having a structural shape and orientation and comprising a cavity, an upper face, a lower face, and a side face,
    wherein when the outer wall of the first basket is sized to fit against the inner wall of the second basket, the outer wall of the second basket corresponds at least in part to the side face of the filtration body, or when the outer wall of the second basket is sized to fit against the inner wall of the first basket, the outer wall of the first basket corresponds at least in part to the side face of the filtration body, wherein the outer wall of the first basket has a top portion and side portion joined by a peripheral portion forming a rim; and the outer wall of the second basket has a bottom portion and a side portion joined by a peripheral portion forming a rim, and wherein the filtration device is made of a rigidified fabric comprising a plurality of heat resistant fibers or a plurality of threads of heat resistant fibers, impregnated with a composition consisting essentially of a mixture of a product A and a product B:

the product A being obtained by polymerisation of saccharide units contained in a mixture consisting essentially of the saccharide units, water and at least one additive selected from the group consisting of acids, inorganic wetting agents, and acid phosphate adhesives; and the product B consisting of at least one inorganic colloidal binding agent, the composition being in a thermoset stage.

9. The filtration device according to claim 8, wherein the end wall of the first basket corresponds to the lower face of the filtration device, and the end wall of the second basket corresponds to the upper face of the filtration device.

10. The filtration device according to claim 8, wherein the filtration device further comprises a filtration pad within the cavity.

11. The filtration device of claim 8 further provided with an insert made of a magnetisable material for handling of the filtration device with a tool provided with a magnet.

12. The filtration device of claim 8, wherein the heat resistant fibers are glass fibers, silica fibers or a mixture thereof, and wherein the product A is obtained by caramelization of a mixture M comprising sucrose, water, and optionally at least one additive selected from the group consisting of acids, inorganic wetting agents and acid phosphate adhesives.

13. A filtration device for the filtration of a molten metal or an alloy thereof, wherein the filtration device is a fabric comprising a plurality of metal threads or a fabric comprising a plurality of rigidified heat resistant fibers, the filtration device having a shape that is to be housed within a housing of a casting mold provided with at least one filing inlet, wherein the housing is a parallelepiped, wherein the fabric is defining a «M» shaped filter, the «M» shape filter having a pair of parallel branches which are to be respectively substantially coplanar with a pair of opposite end of the parallelepipedic housing, and an arch portion having a tip which is either to be oriented toward the the cavity or opposite to the cavity, and wherein the rigidified fabric of heat resistant fibers obtained by thermosetting a composition consisting essentially of a mixture of a product A and a product B;

the product A being obtained by polymerisation of saccharide units contained in a mixture consisting essentially of the saccharide units, water and at least one additive selected from the group consisting of acids, inorganic wetting agents, and acid phosphate adhesives; and the product B consisting of at least one inorganic colloidal binding agent impregnated in a fabric comprising a plurality of heat resistant fibers.

14. The filtration device of claim 13, wherein the tip of the arch portion is to be oriented opposite to the cavity.

15. The filtration device of claim 13, wherein the fabric comprises a plurality of stainless steel threads woven together.

16. The filtration device of claim 13, wherein the filtration device is made of a rigidified fabric comprising a plurality of heat resistant fibers woven together.

17. The filtration device of claim 13, wherein the heat resistant fibers are glass fibers, silica fibers or a mixture thereof, and wherein the product A is obtained by caramelization of a mixture M comprising sucrose, water, and optionally at least one additive selected from the group consisting of acids, inorganic wetting agents and acid phosphate adhesives.

* * * * *

UNITED STATES PATENT AND TRADEMARK OFFICE
CERTIFICATE OF CORRECTION

PATENT NO. : 10,434,569 B2  
APPLICATION NO. : 15/224028  
DATED : October 8, 2019  
INVENTOR(S) : Marcel Gouin et al.

Page 1 of 1

It is certified that error appears in the above-identified patent and that said Letters Patent is hereby corrected as shown below:

In the Claims

Column 24, Claim 13, Line 11, delete the second instance of "the".

Signed and Sealed this
Nineteenth Day of November, 2019

Andrei Iancu
*Director of the United States Patent and Trademark Office*